(12) United States Patent
Sugihara et al.

(10) Patent No.: US 7,928,175 B2
(45) Date of Patent: Apr. 19, 2011

(54) ANTIFOULING PAINT COMPOSITION

(75) Inventors: Mitsunori Sugihara, Hiroshima (JP);
Yukihiro Ikegami, Jiangsu Province (CN); Kazuhiko Hotta, Hiroshima (JP); Kunio Iwase, Aichi (JP); Junichi Nakamura, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 1269 days.

(21) Appl. No.: 10/548,638

(22) PCT Filed: Mar. 12, 2004

(86) PCT No.: PCT/JP2004/003376
§ 371 (c)(1),
(2), (4) Date: Jun. 29, 2006

(87) PCT Pub. No.: WO2004/081121
PCT Pub. Date: Sep. 23, 2004

(65) Prior Publication Data
US 2006/0258772 A1    Nov. 16, 2006

(30) Foreign Application Priority Data

Mar. 14, 2003 (JP) .................. 2003-069916
Mar. 27, 2003 (JP) .................. 2003-087957
Jan. 7, 2004 (JP) .................. 2004-002078
Jan. 7, 2004 (JP) .................. 2004-002079

(51) Int. Cl.
*C09D 153/00* (2006.01)
(52) U.S. Cl. ..... 526/241; 526/240; 526/279; 106/14.44; 106/18.36; 106/15.05; 428/447
(58) Field of Classification Search .................. 526/240, 526/241, 279; 106/14.44, 18.36, 15.05
See application file for complete search history.

(56) References Cited

U.S. PATENT DOCUMENTS 6,177,530 B1 * 1/2001 Sugihara et al. .............. 526/241

FOREIGN PATENT DOCUMENTS

| JP | 62-57464 | | 3/1987 |
|---|---|---|---|
| JP | 62-84166 | | 4/1987 |
| JP | 62-84168 | | 4/1987 |
| JP | 62-156172 | | 7/1987 |
| JP | 62-252480 | | 11/1987 |
| JP | 2-675 | | 1/1990 |
| JP | 5-78617 | | 3/1993 |
| JP | 5-287203 | | 11/1993 |
| JP | 6-192596 | | 7/1994 |
| JP | 08-259645 | | 10/1996 |
| JP | 10-166350 | * | 6/1998 |
| JP | 10-168350 | | 6/1998 |
| JP | 11-035877 | | 2/1999 |
| JP | 11-166152 | * | 6/1999 |
| JP | 2001-72869 | | 3/2001 |
| JP | 2001-323208 | | 11/2001 |
| JP | 2002-12630 | | 1/2002 |
| JP | 2002-294159 | | 10/2002 |

* cited by examiner

Primary Examiner — Margaret G Moore
(74) Attorney, Agent, or Firm — Oblon, Spivak, McClelland, Maier & Neustadt, L.L.P.

(57) ABSTRACT

An object of the present invention is to provide an antifouling paint composition which shows an excellent antifouling effect in seawater for a long period of time, and has excellent adhesion and recoating properties to a substrate. The present invention relates to an antifouling pain composition comprising a copolymer which is obtained by polymerizing a monomer mixture comprising silicon-containing polymerizable monomer (a) having two (meth)acryl end groups, and which contains bivalent metal atom. The copolymer is also obtained by polymerizing a monomer mixture comprising silicon-containing polymerizable monomer (b) having one (meth)acryl end group, and metal atom containing polymerizable monomer (c,) having two unsaturated groups and metal atom selected from Mg, Zn, and Cu.

25 Claims, No Drawings

ANTIFOULING PAINT COMPOSITION

TECHNICAL FIELD

The present invention relates to an antifouling paint composition, and to a copolymer which is suitable for an ingredient of it. More particularly, it relates to an antifouling paint composition for a coating which is capable of inhibiting attachment and accumulation of marine organisms and seaweeds on seawater structures, fishing nets, and ship bottoms.

BACKGROUND ART

Generally, submerged portions of ships and marine structures are provided with antifouling coating for the purpose of preventing corrosion or the drop of cruising speed of the ships due to the attachment of marine organisms such as barnacles, teredos, and algae. Such antifouling coating is also applied to fishing nets used for cultivation to prevent fatal condition of fish and shellfish due to the attachment of the marine organisms on the nets.

An antifouling substance is typically contained in the antifouling coating. An antifouling effect is shown by elution of the substance in seawater. When a disintegrating type antifouling coating comprising a rosin composition is immersed in seawater for a long period of time, the eluting substance is gradually decreased and the proportion of non-eluting component is increased in the coating, and at the same time the surface of the coating becomes uneven, consequently, there is a tendency of large reduction in an effect of preventing adhesion of organisms such as marine organisms and the like. In the case of hydrolysis-type antifouling paint, the coating surface is gradually dissolved away to renew the surface (self polishing) constantly, so that the antifouling substance will be always kept exposed on the coating surface to allow longtime retention of its antifouling effect. This type of antifouling paint, however, tends to contain a large quantity of the antifouling substance to keep the above-mentioned property. Therefore, antifouling paint which can show the property even if it contains less or none of the antifouling substance is under investigation.

For example, JP-A-62-57464 and JP-A-62-84168 describe hydrolysis-type antifouling paints using a copolymer having metal-containing groups at the end of its side chains. JP-A-11-35877 and JP-A-2002-012630 describe self polishing type paint compositions containing a copolymer, as a vehicle, comprising a metal-containing polymerizable monomer and an antifouling agent.

JP-A-62-252480, JP-B-63-2995, JP-A-5-78617, and JP-A-5-287203 describe antifouling paint compositions using reactive curable (crosslinkable) silicone rubber containing silicone oil, silicone resin having hydroxyl group, or polysiloxane having silanol group. JP-A-62-156172 describes an antifouling paint composition containing a polymer having polydimethylsiloxane group as a side chain to form a coating having a property of low surface tension of the polymer.

Further, JP-A-2001-72869 describes a paint composition using a copolymer having polysiloxane structure and a metallic salt of specific organic acid group as side chains to form a coating which shows the antifouling effect even if an antifouling agent is not contained in it.

However, it is necessary for the antifouling paints using metal-containing copolymers described in JP-A-62-57464, JP-A-62-84168, JP-A-11-35877, and JP-A-2002-012630 mentioned above to contain a large quantity of the antifouling substances to obtain the antifouling effect sufficiently.

It is difficult for the antifouling paints using the property of low surface tension described in JP-A-62-252480, JP-B-63-2995, JP-A-5-78617, JP-A-5-287203, and JP-A-62-156172 to keep the low surface tension in seawater and to show the antifouling effect for a long period of time, and these paints have a problem of low adhesion to a substrate.

Though the copolymer used in JP-A-2001-72869 is obtained by reacting monovalent organic acid residues and bivalent metallic oxides on the side chains of copolymer having polysiloxane structures and carboxyl groups, it is not easy to add metal atoms to the carboxyl groups. As a result, it tends to be difficult for the paint using the copolymer to show the self polishing stability and the antifouling effect for a long period of time. And the paint has a problem of low adhesion to a substrate, and it also has a problem of deterioration of the antifouling effect when a pigment is added to a coating composition containing the copolymer.

DISCLOSURE OF THE INVENTION

The inventers have researched the antifouling paint composition to solve the above problems. The inventers have found that some kinds of specific copolymers are suitable for an antifouling composition.

An object of the present invention is to provide an antifouling paint which shows an excellent antifouling effect in seawater for a long period of time even if an antifouling substance is not contained in it, and has excellent adhesion and recoating properties to a substrate, and further, shows the antifouling effects for a long period of time even if a pigment is added to the paint.

One embodiment of the present invention provides an antifouling paint composition containing a copolymer which is obtained by polymerization of a monomer mixture comprising silicon-containing polymerizable monomer (a) having two (meth)acryl end groups or further comprising silicon-containing polymerizable monomer (b) having one (meth)acryl end group, and which has bivalent metal atoms. The other embodiment of the present invention provides an antifouling paint composition containing a copolymer which is obtained by polymerization of a monomer mixture comprising silicon-containing polymerizable monomer (b) having one (meth)acryl end group, and metal atom-containing polymerizable monomer ($c_1$) having two unsaturated groups and metal atoms selected from Mg, Zn, and Cu.

It is preferred for the present invention to contain within the range of 0.1 to 30% by weight of the monomer (a) in the mixture of the monomers for the components of the copolymer, and contain within the range of 1 to 25% by weight of the metal atom in the copolymer.

It is preferred for the present invention to contain within the range of 1 to 60% by weight of the monomer (b) in the mixture of the monomers for the components of the copolymer, and contain within the range of 1 to 25% by weight of the metal atom in the copolymer.

It is preferred for the present invention to contain within the range of 1 to 60% by weight of the amount of the monomer (a) and the monomer (b) in the mixture of the monomers for the components of the copolymer, and contain within the range of 1 to 25% by weight of the metal atom in the copolymer.

It is preferred for the present invention that the copolymer is obtained by polymerization of a monomer mixture comprising metal atom-containing polymerizable monomer (c) having bivalent metal atom selected from Mg, Zn, and Cu. It is preferred that the monomer (c) contains metal atom-containing polymerizable monomer ($c_1$) having two unsaturated groups or metal atom-containing polymerizable monomer ($c_2$) represented by the following formula (V):

$$CH_2=C(R^{71})-CO-O-M-R^{72} \quad (V)$$

wherein $R^{71}$ represents a hydrogen atom or a methyl group; M represents Mg, Zn, or Cu; and $R^{72}$ represents an organic acid residue or an alcohol residue.

When the monomer (b) is used solely as silicon-containing polymerizable monomer having (meth)acryl end group, it is preferred that the monomer ($c_1$) is also used in the mixture of the monomers for the components of the copolymer.

BEST MODE FOR CARRYING OUT THE INVENTION

Within the context of the present invention, when the term "(meth)acrylate" is used in the present specification, it means "acrylate or methacrylate".

The quantity of the silicon-containing polymerizable monomer (a) having two (meth)acryl end groups in the mixture of the monomers for the components of the copolymer is not subjected to any specific restrictions, but it is preferred to be within the range of 0.1 to 30% by weight. A quantity of 0.1% by weight or more of said monomer (a) tends to afford an excellent antifouling effect to the formed coating for a long period of time even if an antifouling substance is not contained in the coating, and afford an excellent recoating property to a substrate to it. A quantity of 30% by weight or less of said monomer (a) tends to prevent progress of gelation in a polymerization process for the copolymer. The preferred range is from 0.5 to 25% by weight. The more preferred range is from 1 to 20% by weight.

An example of the monomer (a) is monomer ($a_1$) represented by the following formula (I):

$$CH_2=C(R^1)-CO-O-(C_kH_{2k}-O-)_l-C_mH_{2m}-(-SiR^2R^3-O-)_n-SiR^4R^5-C_oH_{2o}-(-O-C_pH_{2p}-)_q-O-CO-C(R^6)=CH_2 \quad (I)$$

wherein each of $R^1$ and $R^6$ independently represent a hydrogen atom or a methyl group; each of k and p represents an integer of 2 to 5; each of l and q represents 0 to 50; each m and o represents an integer of 2 to 5; n represents 3 to 80; each of $R^2$, $R^3$, $R^4$, and $R^5$ independently represent an alkyl group, an alkoxy group, a phenyl group, a substituted phenyl group, a phenoxy group, or a substituted phenoxy group.

The monomer ($a_1$) may be used either singly or as a mixture of two or more kinds of it.

The monomer ($a_1$) having 50 or less of the l and q in the formula (I) tends to afford an excellent water proof property to the formed coating.

The monomer ($a_1$) having some polyether structure tends to afford an excellent recoating property to an old coating substrate to it. That is to say, it is preferred that the each of l and q which means average degrees of polymerization of the polyether structure is more than zero. And the preferred upper limit of the each of them is 30. The more preferred range is from 3 to 25. The much more preferred range is from 5 to 20.

Each of k and p in the formula (I) represents an integer of 2 to 5. The preferred integer is 2 or 3 because the cost of the monomer ($a_1$) having the integer tends to be lower.

Each of m and o in the formula (I) represents an integer of 2 to 5. The preferred integer is 2 or 3.

The n in the formula (I) means an average degree of polymerization of the silicon-containing structure. The monomer ($a_1$) having 3 or more of the n in the formula (I) tends to afford an excellent antifouling effect to the formed coating even if an antifouling substance in not contained in it. The monomer ($a_1$) having 80 or less of the n tends to be easy to dissolve in the monomer mixture for the components of the copolymer contained in the present invention and have good polymerizability, and the copolymer tends to be easy to dissolve in organic solvents generally used in coating compositions. The preferred range is from 5 to 50. The more preferred range is from 8 to 40.

Each of $R^2$, $R^3$, $R^4$, and $R^5$ in the formula (I) independently represent an alkyl group, an alkoxy group, a phenyl group, a substituted phenyl group, a phenoxy group, or a substituted phenoxy group. Among these groups, an alkyl group having 1 to 18 carbon atoms is preferred. Methyl or ethyl group is more preferred, and methyl group is much more preferred.

Examples of the monomer ($a_1$) represented by the formula (I) include FM-7711; FM-7721; and FM-7725 (these are produced by Chisso Corporation, l=0, q=0), F2-311-02 (produced by Nippon Unicar Co., Ltd., l=0, q=0), and F2-354-04 (produced by Nippon Unicar Co., Ltd., l>0, q>0).

An example of the monomer (a) is monomer ($a_2$) represented by the following formula (II):

$$CH_2=C(R^{11})-CO-O-(C_kH_{2k'}-O-)_{l'}-C_mH_{2m'}-Si(-(-OSiR^{12}R^{13}-)_r-OSiR^{14}R^{15}R^{16})_2-OSi(-(-OSiR^{17}R^{18}-)_s-OSiR^{19}R^{20}R^{21})_2-C_oH_{2o'}-(-O-C_pH_{2p'}-)_{q'}-O-CO-C(R^{22})=CH_2 \quad (II)$$

wherein each of $R^{11}$ and $R^{22}$ independently represent a hydrogen atom or a methyl group; each of k' and p' represents an integer of 2 to 5; each of l' and q' represents 0 to 50; each of m' and o' represents an integer of 2 to 5; each of r and s represents 0 to 20; each of $R^{12}$, $R^{13}$, $R^{14}$, $R^{15}$, $R^{16}$, $R^{17}$, $R^{18}$, $R^{19}$, $R^{20}$, and $R^{21}$ independently represent an alkyl group.

The monomer ($a_2$) may be used either singly or as a mixture of two or more kinds of it.

The monomer ($a_2$) having 50 or less of the l' and q' in the formula (II) tends to afford an excellent water proof property to the formed coating.

The monomer ($a_2$) having some polyether structure tends to afford an excellent recoating property to an old coating substrate to it. That is to say, it is preferred that the each of l' and q' which means average degrees of polymerization of the polyether structure is more than zero. And the preferred upper limit of the each of them is 30. The more preferred range is from 3 to 25. The much more preferred range is from 5 to 20.

Each of k' and p' in the formula (II) represents an integer of 2 to 5. The preferred integer is 2 or 3 because the cost of the monomer ($a_2$) having the integer tends to be lower.

Each of m' and o' in the formula (II) represents an integer of 2 to 5. The preferred integer is 2 or 3.

Each of r and s in the formula (II) means an average degree of polymerization of the silicon-containing structure. The monomer ($a_2$) having 20 or less of each of r and s in the formula (II) tends to be easy to dissolve in the monomer mixture for the components of the copolymer contained in the composition and have good polymerizability, and the copolymer tends to be easy to dissolve in organic solvents generally used in coating compositions. The preferred range is 10 or less. The more preferred range is 5 or less.

Each of $R^{12}$, $R^{13}$, $R^{14}$, $R^{15}$, $R^{16}$, $R^{17}$, $R^{18}$, $R^{19}$, $R^{20}$, and $R^{21}$ independently represent an alkyl group. Examples of the alkyl group are represented such as methyl group, ethyl group, n-propyl group, and n-butyl group. Methyl or ethyl group is preferred, and methyl group is more preferred.

Examples of the monomer ($a_2$) represented by the formula (II) include F2-312-01 (produced by Nippon Unicar Co., Ltd., l=0, q=0), and F2-312-04 (produced by Nippon Unicar Co., Ltd., l>0, q>0).

The monomer (a) can comprise both of the monomer ($a_1$) and the monomer ($a_2$).

It is more preferred to use the silicon-containing polymerizable monomer (b) having one (meth)acryl end group with the monomer (a). It tends to provide an excellent antifouling effect for a long period of time to the formed coating even if an antifouling substance is not contained in the composition, and provide an excellent adhesion property to a substrate.

When monomer (b) is used with monomer (a), the preferred range of the ratio (mol %) of the monomer (a) and monomer (b) in the monomer mixture ((a)/(b)) is from 1/99 to 80/20. The ratio of 1/99 or more tends to afford a superior antifouling effect for a long period of time and recoating property to a substrate to the formed coating. The ratio of 80/20 or less tends to afford a superior crack resistance and adhesive property to the formed coating. The more preferred ratio is from 3/97 to 60/40.

It is preferred that the amount of monomer (a) and the amount of monomer (b) which are the components of the copolymer is within the range of 1 to 60% by weight. The quantity of 1% by weight or more tends to afford a superior antifouling effect for a long period of time even if an antifouling substance is not contained in the composition. The quantity of 60% by weight or less tends to make the adhesion property and the long-term antifouling effect well-balanced. The more preferred range is from 5 to 50% by weight. The much more preferred range is from 10 to 40% by weight.

An example of the monomer (b) is monomer ($b_1$) represented by the following formula (III):

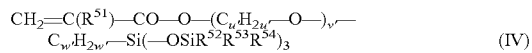

(III)

wherein $R^{41}$ represents a hydrogen atom or a methyl group; u represents an integer of 2 to 5; v represents 0 to 50; w represents an integer of 2 to 5; x represents 3 to 80; each of $R^{42}$, $R^{43}$, $R^{44}$, $R^{45}$, and $R^{46}$ independently represent an alkyl group, an alkoxy group, a phenyl group, a substituted phenyl group, a phenoxy group, or a substituted phenoxy group.

The monomer ($b_1$) may be used either singly or as a mixture of two or more kinds of it.

The monomer ($b_1$) having 50 or less of the v in the formula (III) tends to afford an excellent water proof property to the formed coating.

The monomer ($b_1$) having some polyether structure tends to afford an excellent recoating property to an old coating substrate to it. That is to say, it is preferred that the v which means average degrees of polymerization of the polyether structure is more than zero. The preferred upper limit is 30. The more preferred range is from 3 to 25. The much more preferred range is from 5 to 20.

The u in the formula (III) represents an integer of 2 to 5. The preferred integer is 2 or 3 because the cost of the monomer ($b_1$) having the integer tends to be lower.

The w in the formula (III) represents an integer of 2 to 5. The preferred integer is 2 or 3.

The x in the formula (III) means an average degree of polymerization of the silicon-containing structure. The monomer ($b_1$) having 3 or more of the x in the formula (III) tends to afford an excellent antifouling effect to the formed coating even if an antifouling substance in not contained in it. The monomer ($b_1$) having 80 or less of the x tends to be easy to dissolve in the monomer mixture for the components of the copolymer contained in the composition and have good polymerizability, and the copolymer tends to be easy to dissolve in organic solvents generally used in coating compositions. The preferred range is from 5 to 50. The more preferred range is from 8 to 40.

Each of $R^{42}$, $R^{43}$, $R^{44}$, $R^{45}$, and $R^{46}$ in the formula (III) independently represent an alkyl group, an alkoxy group, a phenyl group, a substituted phenyl group, a phenoxy group, or a substituted phenoxy group. Among these groups, an alkyl group having 1 to 18 carbon atoms is preferred. Methyl or ethyl group is more preferred, and methyl group is much more preferred.

Examples of the monomer ($b_1$) represented by the formula (III) include FM0711; FM-0721; and FM-0725 (these are produced by Chisso Corporation, v=0), X-24-4201; X-22-174DX; and X-22-2426 (these are produced by Shin-Etsu Chemical Co., Ltd., v=0), and F2-254-04; and F2-254-14 (produced by Nippon Unicar Co., Ltd., v>0).

An example of the monomer (b) is monomer ($b_2$) represented by the following formula (IV):

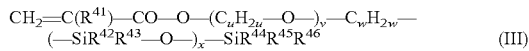

(IV)

wherein $R^{51}$ represents a hydrogen atom or a methyl group; u' represents an integer of 2 to 5; v' represents 0 to 50; w' represents an integer of 2 to 5; each of $R^{52}$, $R^{53}$, and $R^{54}$ independently represent an alkyl group, $R^{55}$ (which represents $-(-O-SiR^{56}R^{57}-)_y-OSiR^{58}R^{59}R^{60}$ wherein y represents an integer of 0 to 20; each of $R^{56}$, $R^{57}$, $R^{58}$, $R^{59}$, and $R^{60}$ independently represent an alkyl group), and $R^{61}$ (which represents $-R^{62}-(-OC_2H_4)_{y'}-OR^{63}$ wherein y' represents an integer of 1 to 20; each of $R^{62}$ and $R^{63}$ independently represent an alkyl group).

The monomer ($b_2$) may be used either singly or as a mixture of two or more kinds of it.

The monomer ($b_2$) having 50 or less of the v' in the formula (IV) tends to afford an excellent water proof property to the formed coating.

The monomer ($b_2$) having some polyether structure tends to afford an excellent recoating property to an old coating substrate to it. That is to say, it is preferred that the v' which means average degrees of polymerization of the polyether structure is more than zero. The preferred upper limit is 30. The more preferred range is from 3 to 25. The much more preferred range is from 5 to 20.

The u' in the formula (IV) represents an integer of 2 to 5. The preferred integer is 2 or 3 because the cost of the monomer ($b_2$) having the integer tends to be lower.

The w' in the formula (IV) represents an integer of 2 to 5. The preferred integer is 2 or 3.

Each of y and y' in the formula (IV) means an average degree of polymerization of the silicon-containing structure. The monomer ($b_2$) having 20 or less of the each of y and y' in the formula (IV) tends to be easy to dissolve in the monomer mixture for the components of the copolymer contained in the composition and have good polymerizability, and the copolymer tends to be easy to dissolve in organic solvents generally used in coating compositions. The preferred range is 10 or less. The more preferred range is 5 or less.

The each of $R^{52}$, $R^{53}$, $R^{54}$, $R^{56}$, $R^{57}$, $R^{58}$, $R^{59}$, $R^{60}$, $R^{62}$, and $R^{63}$ independently represent an alkyl group. Examples of the alkyl group are represented such as methyl group, ethyl group, n-propyl group, and n-butyl group. Methyl or ethyl group is preferred, and methyl group is more preferred.

Examples of the monomer ($b_2$) represented by the formula (IV) include TM-0701 (produced by Chisso Corporation, v'=0), X-22-2404 (produced by Shin-Etsu Chemical Co., Ltd., v'=0), F2-250-01; and F2-302-01 (produced by Nippon Unicar Co., Ltd., v'=0), and F2-302-04 (produced by Nippon Unicar Co., Ltd., v'>0).

The monomer (b) can comprise both of the monomer ($b_1$) and the monomer ($b_2$).

The copolymer used in the present invention has bivalent metal atoms. It is preferred to contain within the range of 1 to 25% by weight of the metal atoms in the copolymer. The more preferred range is from 3 to 20% by weight. The much more preferred range is from 5 to 15% by weight.

Though the copolymer can be obtained by adding bivalent metal atoms to carboxylic groups of a resin, an example of the resin is a polymer having acrylic acid units and a high acid value, it is preferred to obtain the copolymer by polymerizing the metal atom-containing polymerizable monomer (c) having bivalent metal atom. The copolymer obtained by using the monomer (c) tends to afford a stable self polishing effect to the formed coating for a long period of time. It is preferred to use the monomer (c) having Mg, Zn, or Cu as the bivalent metal atom.

The monomer (c) also tends to afford an excellent adhesion property to the formed coating.

Preferred examples of the monomer (c) are metal atom-containing polymerizable monomer ($c_1$) having two unsaturated groups, and metal atom-containing polymerizable monomer ($c_2$) represented by the following formula (V):

$$CH_2=C(R^{71})-CO-O-M-R^{72} \quad (V)$$

wherein $R^{71}$ represents a hydrogen atom or a methyl group; M represents Mg, Zn, or Cu; and $R^{72}$ represents an organic acid residue or an alcohol residue.

When only the monomer (b) is used as the silicon-containing polymerizable monomer having (meth)acryl groups, it is preferred to use the monomer ($c_1$) having Mg, Zn, or Cu.

The monomer ($c_1$) tends to afford a stable self polishing effect to the formed coating for a long period of time.

The quantity of the monomer ($c_1$) in the mixture of the monomers for the components of the copolymer is not subjected to any specific restrictions, but it is preferred to be within the range of 1 to 50% by weight. A composition of 1% by weight or more of said monomer ($c_1$) tends to afford an excellent adhesion property to a substrate to the formed coating, and afford an excellent self polishing effect for a long period of time to it. A composition of 50% by weight or less of said monomer ($c_1$) tends to afford well-balanced properties of crack resistance and adhesion to a substrate to the formed coating immersed in seawater, and tends to retain the self polishing effect. The more preferred range is from 5 to 30% by weight.

Specific examples of the monomer ($c_1$) include magnesium acrylate $[(CH_2=CHCOO)_2Mg]$, magnesium methacrylate $[(CH_2=C(CH_3)COO)_2Mg]$, zinc acrylate $[(CH_2=CHCOO)_2Zn]$, zinc methacrylate $[(CH_2=C(CH_3)COO)_2Zn]$, copper acrylate $[(CH_2=CHCOO)_2Cu]$, copper methacrylate $[(CH_2=C(CH_3)COO)_2Cu]$. These monomers may be used either singly or as a mixture of two or more of them. Zinc (meth)acrylate is especially preferred because it tends to afford high transparency which gives excellent colors to the formed coating, and it tends to have high solubility to organic solvents which is used generally for polymerization and have good handling ability.

It is preferred that the monomer ($c_1$) is obtained by a reaction of an inorganic metal compound and a carboxyl group-containing radical polymerizable monomer such as (meth)acrylic acid in organic solvent comprising alcohol and water. The reactant by this reaction containing the monomer ($c_1$) tends to be easy to dissolve in the organic solvent used in polymerization and the monomer mixture for the components of the copolymer contained in the composition, and tends to have good polymerizability. It is preferred that the quantity of the water for the reaction is from 0.01 to 30% by weight.

The monomer ($c_2$) represented by the above-mentioned formula (V) tends to afford an excellent antifouling effect to the formed coating.

The quantity of the monomer ($c_2$) in the monomer mixture for the components of the copolymer is not subjected to any specific restrictions, but it is preferred to be within the range of 1 to 60% by weight. A quantity of 1% by weight or more of said monomer ($c_2$) tends to afford excellent crack resistance and excellent adhesion to a substrate to the formed coating. A quantity of 60% by weight or less of said monomer ($c_2$) tends to afford excellent antifouling property and excellent self polishing property for a long period of time to it. The more preferred range is from 5 to 40% by weight.

Specific examples of the monomer ($c_2$) include magnesium acetate(meth)acrylate, zinc acetate(meth)acrylate, copper acetate(meth)acrylate, magnesium monochloroacetate (meth)acrylate, zinc monochloroacetate(meth)acrylate, copper monochloroacetate(meth)acrylate, magnesium monofluoroacetate(meth)acrylate, zinc monofluoroacetate(meth) acrylate, copper monofluoroacetate(meth)acrylate, magnesium propionate(meth)acrylate, zinc propionate (meth)acrylate, copper propionate(meth)acrylate, magnesium caproate(meth)acrylate, zinc caproate(meth)acrylate, copper caproate(meth)acrylate, magnesium caprylate(meth) acrylate, zinc caprylate(meth)acrylate, copper caprylate (meth)acrylate, magnesium 2-ethylhexanoate(meth)acrylate, zinc 2-ethylhexanoate(meth)acrylate, copper 2-ethylhexanoate(meth)acrylate, magnesium caprate(meth)acrylate, zinc caprate(meth)acrylate, copper caprate(meth)acrylate, magnesium versatate(meth)acrylate, zinc versatate(meth) acrylate, copper versatate(meth)acrylate, magnesium isostearate(meth)acrylate, zinc isostearate(meth)acrylate, copper isostearate(meth)acrylate, magnesium palmitate(meth)acrylate, zinc palmitate(meth)acrylate, copper palmitate(meth) acrylate, magnesium cresotinate(meth)acrylate, zinc cresotinate(meth)acrylate, copper cresotinate(meth)acrylate, magnesium oleate(meth)acrylate, zinc oleate(meth)acrylate, copper oleate(meth)acrylate, magnesium elaidate(meth) acrylate, zinc elaidate(meth)acrylate, copper elaidate(meth) acrylate, magnesium linoleate(meth)acrylate, zinc linoleate (meth)acrylate, copper linoleate(meth)acrylate, magnesium linolenate(meth)acrylate, zinc linolenate(meth)acrylate, copper linolenate(meth)acrylate, magnesium stearate(meth) acrylate, zinc stearate(meth)acrylate, copper stearate(meth) acrylate, magnesium ricinoleate(meth)acrylate, zinc ricinoleate(meth)acrylate, copper ricinoleate(meth)acrylate, magnesium linoelaidate(meth)acrylate, zinc linoelaidate (meth)acrylate, copper linoelaidate(meth)acrylate, magnesium erucate(meth)acrylate, zinc erucate(meth)acrylate, copper erucate(meth)acrylate, magnesium α-naphthoate(meth) acrylate, zinc α-naphthoate(meth)acrylate, copper α-naphthoate(meth)acrylate, magnesium β-naphthoate (meth)acrylate, zinc β-naphthoate(meth)acrylate, copper β-naphthoate(meth)acrylate, magnesium benzoate (meth) acrylate, zinc benzoate(meth)acrylate, copper benzoate (meth)acrylate, magnesium 2,4,5-trichlorophenoxyacetate (meth)acrylate, zinc 2,4,5-trichlorophenoxyacetate(meth) acrylate, copper 2,4,5-trichlorophenoxyacetate(meth) acrylate, magnesium 2,4-dichlorophenoxyacetate(meth) acrylate, zinc 2,4-dichlorophenoxyacetate(meth)acrylate, copper 2,4-dichlorphenoxyacetate(meth)acrylate, magnesium quinolinecarboxylate(meth)acrylate, zinc quinolinecarboxylate(meth)acrylate, copper quinolinecarboxylate(meth) acrylate, magnesium nitrobenzoate(meth)acrylate, zinc nitrobenzoate(meth)acrylate, copper nitrobenzoate(meth) acrylate, magnesium nitronaphthalenecarboxylate(meth) acrylate, zinc nitronaphthalenecarboxylate(meth)acrylate, copper nitronaphthalenecarboxylate(meth)acrylate, magnesium pulvinate(meth)acrylate, zinc pulvinate(meth)acrylate, and copper pulvinate(meth)acrylate, and the like. These monomers may be used either singly or as a mixture of two or more of them. Among them, the monomers having a fatty acid residue as an organic acid residue are preferred because these monomers tend to make the formed coating retain excellent crack resistance and adhesion to a substrate for a long period of time. Among them, zinc-containing monomers are preferred because they tend to afford high transparency which gives excellent colors to the formed coating, and they tend to have high solubility to organic solvents which are used generally for polymerization and have good handling ability. Especially, monomers having high plasticity such as zinc oleate(meth)acrylate and zinc versatate(meth)acrylate are preferred. The monomer ($c_2$) represented by the above-mentioned formula (V) can be obtained, for example, by a reaction of an inorganic metal compound, a carboxyl group-containing radical polymerizable monomer such as (meth)acrylic acid, and a non-polymerizable organic acid in organic solvent comprising alcohol.

Using of both of monomer ($c_1$) and monomer ($c_2$) as the monomer (c) is preferred because the self polishing effect of the formed coating tends to be maintained for a long period of time, and tends to afford well-balanced property of crack resistance and adhesion to a substrate to the formed coating. Especially, the combination of zinc(meth)acrylate as the monomer ($c_1$) and zinc oleate(meth)acrylate or zinc versatate (meth)acrylate as the monomer ($c_2$) is preferred.

When both of monomer ($c_1$) and monomer ($c_2$) are used in the monomer (c), it is preferred that the ratio (mol) of the monomers (($c_2$)/($c_1$)) is within the range of 20/80 to 80/20. The ratio of 20/80 or more tends to afford an excellent self polishing property for a long period of time to the formed coating. The ratio of 80/20 or less tends to afford an excellent crack resistant property and an excellent adhesive property to it. The more preferred ratio is from 30/70 to 70/30.

The polymerizable monomer (d) may be used as a component of the copolymer contained in the composition.

The quantity of monomer (d) in the monomer mixture for the components of the copolymer is not subjected to any specific restrictions, but it is preferred to be within the range of 0.1 to 89% by weight. A quantity of 0.1% by weight or more of said monomer (d) tends to afford well-balanced properties to the formed coating. A quantity of 89% by weight or less of said monomer (d) tends to afford a balanced adhesion property to a substrate and an excellent self polishing property for a long period of time to it, and it also tends to afford an excellent antifouling effect even if an antifouling substance is not contained in it. The more preferred range is from 7 to 75% by weight. The much more preferred range is from 10 to 70% by weight.

Specific examples of the monomer (d) include (meth) acrylic acid esters such as methyl(meth)acrylate, ethyl(meth) acrylate, 2-methoxyethyl(meth)acrylate, 2-ethoxyethyl (meth)acrylate, phenoxyethyl(meth)acrylate, 2-(2-ethylhexaoxy)ethyl(meth)acrylate, 1-methyl-2-methoxyethyl(meth)acrylate, 3-methoxybutyl(meth) acrylate, 3-methyl-3-methoxybutyl(meth)acrylate, m-methoxyphenyl(meth)acrylate, p-methoxyphenyl(meth) acrylate, o-methoxyphenylethyl(meth)acrylate, m-methoxyphenylethyl(meth)acrylate, p-methoxyphenylethyl(meth) acrylate, n-propyl(meth)acrylate, i-propyl(meth)acrylate, n-butyl(meth)acrylate, i-butyl(meth)acrylate, t-butyl(meth) acrylate, 2-ethylhexyl(meth)acrylate, lauryl(meth)acrylate, stearyl(meth)acrylate, benzyl(meth)acrylate, phenyl(meth) acrylate, isobonyl(meth)acrylate, cyclohexyl(meth)acrylate, and glycidyl(meth)acrylate; hydroxyl group-containing monomers such as 2-hydroxyethyl(meth)acrylate, 2-hydroxypropyl(meth)acrylate, 3-hydroxypropyl(meth)acrylate, 2-hydroxybutyl(meth)acrylate and 4-hydroxybutyl(meth) acrylate; adducts of 2-hydroxyethyl(meth)acrylate with ethylene oxide, propylene oxide, γ-butyrolactone or ε-caprolactone; dimers or trimers of hydroxyl group-containing monomers such as 2-hydroxyethyl(meth)acrylate and 2-hydroxypropyl(meth)acrylate; monomers having plural hydroxyl groups such as glycerol(meth)acrylate; vinyl monomers containing primary and secondary amino groups such as butylaminoethyl(meth)acrylate and (meth)acrylamide; vinyl monomers containing tertiary amino groups such as dimethylaminoethyl(meth)acrylate, diethylaminoethyl(meth)acrylate, dimethylaminopropyl(meth)acrylate, dimethylaminobutyl(meth)acrylate, dibutylaminoethyl(meth)acrylate, dimethylaminoethyl(meth)acrylamide, and dimethylaminopropyl(meth)acrylamide; heterocyclic basic monomers such as vinylpyrrolidone, vinylpyridine, and vinycarbazole; and vinyl monomers such as styrene, vinyltoluene, α-methylstyrene, (meth)acrylonitrile, vinyl acetate and vinyl propionate.

Though the method of producing the above-mentioned copolymer is not particularly restricted, for example, this copolymer can be obtained by polymerizing the above-mentioned monomer mixture in the presence of a radical initiator at a temperature of 60 to 180° C. for 5 to 14 hours. Specific examples of the radical initiator include 2,2'-azobisisobutyronitrile, 2,2'-azobis-(2,4-dimethylvaleronitrile), 2,2'-azobis-(2-methylbutyronitrile), benzoyl peroxide, cumene hydroperoxide, lauryl peroxide, di-t-butyl peroxide, t-butyl peroxy2-ethylhexanoate.

It is especially preferred to use a chain transfer agent in the polymerization when the monomer ($c_1$) is contained in the monomer mixture. It tends to prevent production of cullet during the polymerization and afford superior productivity of the copolymer. The resin content of the composition can be increased easily by using it. From the standpoint of the solubility to the monomer (c), it is preferred to use a styrene dimmer and the like as a chain transfer agent, and not to use mercaptan. As the polymerization method, an emulsion polymerization method, suspension polymerization method and the like can be adopted in addition to a solution polymerization method which uses an organic solvent. Particularly, a solution polymerization method using a general organic solvent such as toluene, xylene, methyl isobutyl ketone, n-butyl acetate or the like is preferred from the standpoint of productivity of the composition and the performance of the formed coating.

Though the weight-average molecular weight of the copolymer used in the composition may be changed by a condition of the polymerization, the preferred range is from 1,000 to 3,000,000. A copolymer having 1,000 or more of the weight-average molecular weight tends to afford an excellent antifouling effect to the formed coating. A copolymer having 3,000,000 or less of the weight-average molecular weight tends to be easy to exist in the paint composition uniformly. The more preferred range is from 3,000 to 100,000. The much more preferred range is from 5,000 to 50,000. The weight-average molecular weight can be measured by Gel Permeation Chromatography (GPC). The copolymer having monomer units come from the monomer ($a_1$) can be detected by $^1$H-NMR, ICP emission spectroscopic analysis, and the like. The copolymer having bivalent metal atoms can be detected by atomic absorption spectrometry and the like.

When the antifouling paint composition of the present invention contains the above-mentioned copolymer the formed coating can hold an excellent antifouling effect. The antifouling effect can be further enhanced by adding an antifouling substance.

The preferred ratio of the copolymer, as a vehicle, in the antifouling paint composition of the present invention is usually from 20 to 30% by weight when the composition contains additives such as an antifouling substance, a pigment, and the like. Proper vehicle content in the composition tends to afford an excellent antifouling effect and an excellent crack resistant property to the formed coating.

The antifouling substance can be properly selected according to the product performance requirement. There can be used, for example, coppery antifouling substance such as cuprous oxide, copper thiocyanate and copper powder, compounds of other metals such as lead, zinc, nickel, etc, amine derivatives such as diphenylamine, nitrile compounds, benzothiazole compounds, maleimide compounds, pyridine compounds, and the like. They may be used either singly or as a mixture of two or more of them.

Especially, compounds researched and selected by the ship builders' association of Japan are preferred. Specific examples of the compounds include manganese ethylene bisdithiocarbamate, zinc dimethyldithiocarbamate, 2-methylthio-4-tert-butylamino-6-cyclopropylamino-s-triazine, 2,4,5,6-tetrachlorophthalonitrile, N,N'-dimethyldichlorophenylurea, zinc ethylenebisdithiocarbamate, copper rhodanide, 4,5-dichloro-2-n-octyl-3(2H)-isothiazoline, N-(fluorodichloromethylthio)phthalimide, N,N'-dimethyl-N'-phenyl-(N-fluorodichloromethylthio)sulfamide, 2-pyridinethiol-1-oxide zinc salt, tetramethylthiuram disulfide, Cu-10% Ni alloy, 2,4,6-trichlorophenylmaleimide, 2,3,5,6-tetrachloro-4-(methylsulfonyl)pyridine, 3-iodo-2-propyl butylcarbamate, diiodomethyl p-tolylsulfone, bisdimethyldithiocarbamoylzinc, zinc ethylenebisdithiocarbamate, phenyl(bispyridyl)bismuthdichloride, 2-(4-thiazolyl)-benzimidazol, and pyridine-triphenylborane.

In the antifouling paint composition of the present invention, it is also possible to blend a silicon compound such as polydimethyl siloxane, silicone oil, and fluorine-containing compound like carbon fluoride for the purpose of superior smoothness of the coating surface which works for preventing the attachment of organisms. It is also possible to blend an extender, a color pigment, a plasticizer, a paint additive, another resin and so on in the composition. Specific examples of the pigment include titanium oxide, talc, barium precipitated, iron oxide red and so on. They may be used either singly or as a mixture of two or more of them.

A solvent such as xylene, propylene glycol methyl ether, toluene, methyl isobutyl ketone, n-butyl acetate, n-butanol, and the like may be used in the antifouling paint composition of the present invention. They may be used either singly or as a mixture of two or more of them.

For forming a coating by using the antifouling paint composition of the present invention, said composition may be coated on the surface of substrate directly. Specific examples of the substrate include a ship, a fishing net, an underwater structure such as port facility, oil fence, bridge, submarine infrastructure and so on. It may also be coated on a primer coating or an intermediate coating applied on the surface of substrate. The primer coating may be formed by washer primer, chlorinated rubber or epoxy primer and the like. The antifouling paint composition may be applied by using a brush, a spray, a roller, by dipping, and so on. The thickness of the formed coating is usually within the range of 50 to 400 μm as dry film. Drying of the coating is usually conducted at room temperature, but it may be done under heating.

Having generally described this invention, a further understanding can be obtained by reference to certain specific examples which are provided herein for purposes of illustration only and are not intended to be limiting unless otherwise specified.

EXAMPLES

Hereinafter, the present invention is explained more specifically by the following non-limiting examples. In the following, "parts" in examples and comparative examples refer to "parts by weight" unless otherwise specified.

Production Example M1

Production of a Monomer Mixture M1 Comprising Metal Atom-Containing Polymerizable Monomers Into a four-neck flask equipped with a condenser, a thermometer, a dropping funnel and a stirrer was charged 85.4 parts of PGM (propylene glycol methyl ether) and 40.7 parts of zinc oxide, and the mixture was heated up to 75° C. while stirring. Then, a mixture of 43.1 parts of methacrylic acid, 36.1 parts of acrylic acid, and 5 parts of water was added dropwise from the dropping funnel over 3 hours at constant speed. Further, it was stirred for 2 hours, then, to it was added 36 parts of nBuOH to obtain a transparent monomer mixture M1 comprising metal atom-containing polymerizable monomers. The solid content was 44.8% by weight.

Production Example M2

Production of a Monomer Mixture M2 Comprising Metal Atom-Containing Polymerizable Monomers Into a four-neck flask equipped with a condenser, a thermometer, a dropping funnel and a stirrer was charged 72.4 parts of PGM (propylene glycol methyl ether) and 40.7 parts of zinc oxide, and the mixture was heated up to 75° C. while stirring. Then, a mixture of 30.1 parts of methacrylic acid, 25.2 parts of acrylic acid, and 51.6 parts of versatic acid was added dropwise from the dropping funnel over 3 hours at constant speed. Further, it was stirred for 2 hours, then, to it was added 11 parts of PGM to obtain a transparent monomer mixture M2 comprising metal atom-containing polymerizable monomers. The solid content was 59.6% by weight.

Production Example M3

Production of a Monomer Mixture M3 Comprising Metal Atom-Containing Polymerizable Monomers Into a four-neck flask equipped with a condenser, a thermometer, a dropping funnel and a stirrer was charged 60 parts of xylene, and 13 parts of PGM (propylene glycol methyl ether) and 40.7 parts of zinc oxide, and the mixture was heated up to 75° C. while stirring. Then, a mixture of 32.3 parts of methacrylic acid, 27 parts of acrylic acid, and 37.7 parts of oleic acid, 2.3 parts of acetic acid, and 5.8 parts of propionic acid was added dropwise from the dropping funnel over 3 hours at constant speed. Further, it was stirred for 2 hours, then, to it was added 77 parts of xylene, and 46 parts of PGM to obtain a transparent monomer mixture M3 comprising metal atom-containing polymerizable monomers. The solid content was 39.6% by weight.

Production Example M4

Production of a Monomer Mixture M4 Comprising Metal Atom-Containing Polymerizable Monomers Into a four-neck flask equipped with a condenser, a thermometer, a dropping funnel and a stirrer was charged 85 parts of PGM (propylene glycol methyl ether) and 40.7 parts of zinc oxide, and the mixture was heated up to 75° C. while stirring. Then, a mixture of 21.5 parts of methacrylic acid, 18 parts of acrylic acid, and 85.5 parts of versatic acid was added dropwise from the dropping funnel over 3 hours at constant speed. Further, it was stirred for 2 hours, then, to it was added 10.5 parts of PGM to obtain a transparent monomer mixture M4 comprising metal atom-containing polymerizable monomers. The solid content was 59.8% by weight.

Production Example P1

Production of a Resin Composition P1 Comprising Metal Atom-Containing Copolymer Into a four-neck flask equipped with a condenser, a thermometer, a dropping funnel and a stirrer was charged 15 parts of PGM (propylene glycol methyl ether), 65 parts of xylene and 4 parts of ethyl acrylate, and the mixture was heated up to 100° C. while stirring. Then, a transparent mixture of 32.3 parts of methyl methacrylate, 43.9 parts of ethyl acrylate, 10 parts of FM-7711 (product of Chisso Corporation), 21.7 parts of the monomer mixture M1 described in the Production Example M1, 10 parts of xylene, 2 parts of Nofmer MSD α-methylstyrene dimer, product of NOF Corporation), 2.5 parts of AIBN (azobis isobutyronitrile), and 7.5 parts of AMBN (azobis methylbutyronitrile) was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a pale yellow transparent resin composition P1 comprising metal atom-containing copolymer. The solid content was 46.2% by weight. The Gardner viscosity was +W.

The weight-average molecular weight of the copolymer in P1 was 5,400 when P1 was analyzed by Gel Permeation Chromatography (HLC-8120GPC by Tosoh Corporation, eluate: dimethylformamide).

The copolymer was precipitated by adding methanol to P1. Into a platinum crucible was charged the copolymer and sulfuric acid, and the crucible having the mixture was heated up in a container for pressure degradation. After the sulfuric acid was volatilized, ashing of the copolymer was completed. The obtained ash was cooled down and treated by alkali fusion. Si atom was detected in the treated ash when it was analyzed by an ICP emission spectrometer (ICAP-575 MK-11 by Thermo Jarrel Ash Coporation.). And when the copolymer was analyzed by an atomic absorption spectrometer (AA6800 by Shimadzu Corporation), signals from Zn atom were detected.

Production Example P2

Production of a Resin Composition P2 Comprising Metal Atom-Containing Copolymer Into a four-neck flask equipped with a condenser, a thermometer, a dropping funnel and a stirrer was charged 15 parts of PGM (propylene glycol methyl ether), 65 parts of xylene and 4 parts of ethyl acrylate, and the mixture was heated up to 100° C. while stirring. Then, a transparent mixture of 32.3 parts of methyl methacrylate, 33.9 parts of ethyl acrylate, 20 parts of FM-7721 (product of Chisso Corporation), 21.7 parts of the monomer mixture M1 described in the Production Example M1, 10 parts of xylene, 1.5 parts of Nofmer MSD (product of NOF Corporation), 2.5 parts of AIBN, and 5 parts of AMBN was added dropwise by use of a dropping pump over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a milky resin composition P2 comprising metal atom-containing copolymer. The solid content was 46.1% by weight. The Gardner viscosity was +U.

The weight-average molecular weight of the copolymer in P2 was 6,200 when P2 was analyzed by Gel Permeation Chromatography (HLC-120GPC by Tosoh Corporation, eluate: dimethylformamide).

Production Example P3

Production of a Resin Composition P3 Comprising Metal Atom-Containing Copolymer Into a four-neck flask equipped with a condenser, a thermometer, a dropping funnel and a stirrer was charged 15 parts of PGM (propylene glycol methyl ether), 59 parts of xylene and 4 parts of ethyl acrylate, and the mixture was heated up to 100° C. while stirring. Then, a transparent mixture of 26.4 parts of methyl methacrylate, 40.5 parts of ethyl acrylate, 15 parts of F2-354-04 (product of Nippon Unicar Co., Ltd.), 31.3 parts of the monomer mixture M1 described in The Production Example M1, 10 parts of xylene, 2 parts of Nofmer MSD (product of NOF Corporation), 2.5 parts of AIBN, and 8 parts of AMBN was added dropwise by use of a dropping pump over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.8 parts of xylene to obtain a milky resin composition P3 comprising metal atom-containing copolymer. The solid content was 46.4% by weight. The Gardner viscosity was +R.

The weight-average molecular weight of the copolymer in P3 was 5,600 when P3 was analyzed by Gel Permeation Chromatography (HLC8120GPC by Tosoh Corporation, eluate: dimethylformamide).

Production Example P4

Production of a Resin Composition P4 Comprising Metal Atom-Containing Copolymer Into a four-neck flask equipped with a condenser, a thermometer, a dropping funnel and a stirrer was charged 15 parts of PGM (propylene glycol methyl ether), 59 parts of xylene and 4 parts of ethyl acrylate, and the mixture was heated up to 100° C. while stirring. Then, a transparent mixture of 26.4 parts of methyl methacrylate, 35.5 parts of ethyl acrylate, 20 parts of F2-312-01 (product of Nippon Unicar Co., Ltd.), 31.3 parts of the monomer mixture M1 described in The Production Example M1, 10 parts of xylene, 1.5 parts of Nofmer MSD (product of NOF Corporation), 2.5 parts of AIBN, and 7.5 parts of AMBN was added dropwise by use of a dropping pump over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.8 parts of xylene to obtain a milky resin composition P4 comprising metal atom-containing copolymer. The solid content was 45.8% by weight. The Gardner viscosity was −W.

The weight-average molecular weight of the copolymer in P4 was 5,500 when P4 was analyzed by Gel Permeation Chromatography (HLC-8120GPC by Tosoh Corporation, eluate: dimethylformamide).

Production Example P5

Production of a Resin Composition P5 Comprising Metal Atom-Containing Copolymer

Into a four-neck flask equipped with a condenser, a thermometer, a dropping funnel and a stirrer was charged 15 parts of PGM (propylene glycol methyl ether), 65 parts of xylene and 4 parts of ethyl acrylate, and the mixture was heated up to 100° C. while stirring. Then, a transparent mixture of 32.3 parts of methyl methacrylate, 13.9 parts of ethyl acrylate, 5 parts of FM-7711 (product of Chisso Corporation), 35 parts of FM-0711 (product of Chisso Corporation), 21.7 parts of the monomer mixture M1 described in The Production Example M1, 10 parts of xylene, 1.2 parts of Nofmer MSD (product of NOF Corporation), 2.5 parts of AIBN, and 4 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene was obtain a pale yellow transparent resin composition P5 comprising metal atom-containing copolymer. The solid content was 45.6% by weight. The Gardner viscosity was +V.

The weight-average molecular weight of the copolymer in P5 was 9,000 when P5 was analyzed by Gel Permeation Chromatography (HLC-8120GPC by Tosoh Corporation, eluate: dimethylformamide).

Production Example P6

Production of a Resin Composition P6 Comprising Metal Atom-Containing Copolymer

Into a four-neck flask equipped with a condenser, a thermometer, a dropping funnel and a stirrer was charged 35 parts of PGM (propylene glycol methyl ether) and 31 parts of xylene, and the mixture was heated up to 100° C. while stirring. Then, a transparent mixture of 18 parts of methyl methacrylate, 25 parts of ethyl acrylate, 10 parts of FM-7721 (product of Chisso Corporation), 30 parts of X-24-8201 (product of Shin-Etsu Chemical Co., Ltd.), 28.4 parts of the monomer mixture M2 described in The Production Example M2, 30 parts of xylene, 2.5 parts of AIBN, and 2.5 parts of AMBN was added dropwise over 4 hours at constant speed. After completion of addition, 0.5 parts of t-butyl peroctoate and 10 parts of xylene were added dropwise over 30 minutes, the mixture was further stirred for 1 hour and 30 minutes, then, to this was added 4.6 parts of xylene to obtain a slightly cloudy resin composition P6 comprising metal atom-containing copolymer. The solid content was 45.4% by weight. The Gardner viscosity was −V.

The weight-average molecular weight of the copolymer in P6 was 7,200 when P6 was analyzed by Gel Permeation Chromatography (HLC-8120GPC by Tosoh Corporation, eluate: dimethylformamide).

Production Example P7

Production of a Resin Composition P7 Comprising Metal Atom-Containing Copolymer

Into a four-neck flask equipped with a condenser, a thermometer, a dropping funnel and a stirrer was charged 40 parts of PGM (propylene glycol methyl ether) and 31 parts of xylene, and the mixture was heated up to 100° C. while stirring. Then, a transparent mixture of 18 parts of methyl methacrylate, 15 parts of ethyl acrylate, 10 parts of FM-7711 (product of Chisso Corporation), 10 parts of FM-7721 (product of Chisso Corporation), 30 parts of FM-0711 (product of Chisso Corporation), 42.5 parts of the monomer mixture M3 described in The Production Example M3, 10 parts of xylene, 2.5 parts of AIBN, and 4.5 parts of AMBN was added dropwise by use of a dropping pump over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 5.5 parts of xylene to obtain a slightly cloudy resin composition P7 comprising metal atom-containing copolymer. The solid content was 45.6% by weight. The Gardner viscosity was −T.

The weight-average molecular weight of the copolymer in P7 was 6,400 when P7 was analyzed by Gel Permeation Chromatography (HLC-8120GPC by Tosoh Corporation, eluate: dimethylformamide).

Production Example P8

Production of a Resin Composition P8 Comprising Metal Atom-Containing Copolymer

Into a four-neck flask equipped with a condenser, a thermometer, a dropping funnel and a stirrer was charged 15 parts of PGM (propylene glycol methyl ether), 59 parts of xylene and 4 parts of ethyl acrylate, and the mixture was heated up to 100° C. while stirring. Then, a transparent mixture of 26.4 parts of methyl methacrylate, 15.5 parts of ethyl acrylate, 2 parts of F2-312-04 (product of Nippon Unicar Co., Ltd.), 38 parts of F2-302-04 (product of Nippon Unicar Co., Ltd.), 31.3 parts of the monomer mixture M1 described in The Production Example M1, 10 parts of xylene, 1.2 parts of Nofmer MSD (product of NOF Corporation), 2.5 parts of AIBN, and 5.5 parts of AMBN was added dropwise by use of a dropping pump over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.8 parts of xylene to obtain a milky resin composition P8 comprising metal atom-containing copolymer. The solid content was 45.6% by weight. The Gardner viscosity was −T.

The weight-average molecular weight of the copolymer in P8 was 5,600 when P8 was analyzed by Gel Permeation Chromatography (HLC-8120GPC by Tosoh Corporation, eluate: dimethylformamide).

Production Example P9

Production of a Resin Composition P9 Comprising Metal Atom-Containing Copolymer

Into a four-neck flask equipped with a condenser, a thermometer, a dropping funnel and a stirrer was charged 35 parts of PGM (propylene glycol methyl ether) and 31 parts of xylene, and the mixture was heated up to 100° C. while stirring. Then, a transparent mixture of 18 parts of methyl methacrylate, 45 parts of ethyl acrylate, 10 parts of F2-312-04 (produced by Nippon Unicar Co., Ltd.), 10 parts of TM-0701 (product of Chisso Corporation), 28.4 parts of the monomer mixture M2 described in The Production Example M2, 30 parts of xylene, 2.5 parts of AIBN, and 5 parts of AMBN was added dropwise over 4 hours at constant speed. After completion of addition, 0.5 parts of t-butyl peroctoate and 10 parts of xylene were added dropwise over 30 minutes, the mixture was further stirred for 1 hour and 30 minutes, then, to this was added 4.6 parts of xylene to obtain a slightly cloudy resin composition P9 comprising metal atom-containing copolymer. The solid content was 45.6% by weight. The Gardner viscosity was +W.

The weight-average molecular weight of the copolymer in P9 was 6,000 when P9 was analyzed by Gel Permeation Chromatography (HLC-8120GPC by Tosoh Corporation, eluate: dimethylformamide).

Production Example P10

Production of a Resin Composition P10 Comprising Metal Atom-Containing Copolymer Into a four-neck flask equipped with a condenser, a thermometer, a dropping funnel and a stirrer was charged 120 parts of xylene and 30 parts of n-butanol, and the mixture was heated up to 100° C. while stirring. Then, a mixture of 20 parts of ethyl acrylate, 25 parts of 2-ethylhexyl acrylate, 15 parts of acrylic acid, 5 parts of FM-7711 (these are produced by Chisso Corporation), 35 parts of FM-0711 (these are produced by Chisso Corporation), and 4 parts of AIBN, and 5.5 parts of AMBN was added dropwise from the dropping funnel over 3 hours at constant speed. After completion of addition, the mixture was further stirred for 2 hours, and a varnish was obtained. The solid content was 39.4% by weight. The Gardner viscosity was +G.

And into a four-neck flask equipped with a condenser, a thermometer, a dropping funnel and a stirrer was charged 100 parts of the obtained varnish, 20 parts of naphthenic acid and 7 parts of copper hydroxide, and the mixture was heated up to 120° C. and 2.6 g of water was dehydrated while stirring for 2 hours to obtain a resin composition P10 comprising metal atom-containing copolymer. The solid content was 50.4% by weight. The Gardner viscosity was −M.

The weight-average molecular weight of the copolymer in P10 was 9,800 when P10 was analyzed by Gel Permeation Chromatography (HLC-8120GPC by Tosoh Corporation, eluate: dimethylformamide).

Production Example P11

Production of a Resin Composition P11 Comprising Metal Atom-Containing Copolymer Into a four-neck flask equipped with a condenser, a thermometer, a dropping funnel and a stirrer was charged 15 parts of PGM (propylene glycol methyl ether), 65 parts of xylene and 4 parts of ethyl acrylate, and the mixture was heated up to 100° C. while stirring. Then, a transparent mixture of 32.3 parts of methyl methacrylate, 43.9 parts of ethyl acrylate, 10 parts of FM-0721 (product of Chisso Corporation), 21.7 parts of the monomer mixture M1 described in The Production Example M1, 10 parts of xylene, 1.2 parts of Nofmer MSD α-methylstyrene dimer, product of NOF Corporation), 2.5 parts of AIBN (azobis isobutyronitrile), and 3 parts of AMBN (azobis methylbutyronitrile) was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a pale yellow transparent resin composition P11 comprising metal atom-containing copolymer. The solid content was 45.7% by weight. The Gardner viscosity was −U.

The weight-average molecular weight of the copolymer in P11 was 6,800 when P11 was analyzed by Gel Permeation Chromatography (HLC-8120GPC by Tosoh Corporation, eluate: dimethylformamide).

Production Example P12

Production of a Resin Composition P12 Comprising Metal Atom-Containing Copolymer Into a four-neck flask equipped with a condenser, a thermometer, a dropping funnel and a stirrer was charged 15 parts of PGM (propylene glycol methyl ether), 65 parts of xylene and 4 parts of ethyl acrylate, and the mixture was heated up to 100° C. while stirring. Then, a transparent mixture of 32.3 parts of methyl methacrylate, 33.9 parts of ethyl acrylate, 20 parts of FM-0711 (product of Chisso Corporation), 21.7 parts of the monomer mixture M1 described in The Production Example M1, 10 parts of xylene, 1.2 parts of Nofmer MSD α-methylstyrene dimer, product of NOF Corporation), 2.5 parts of AIBN, and 2 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a pale yellow transparent resin composition P12 comprising metal atom-containing copolymer. The solid content was 45.4% by weight. The Gardner viscosity was +V.

The weight-average molecular weight of the copolymer in P12 was 7,600 when P12 was analyzed by Gel Permeation Chromatography (HLC-8120GPC by Tosoh Corporation, eluate: dimethylformamide).

Production Example P13

Production of a Resin Composition P13 Comprising Metal Atom-Containing Copolymer Into a four-neck flask equipped with a condenser, a thermometer, a dropping funnel and a stirrer was charged 15 parts of PGM (propylene glycol methyl ether), 65 parts of xylene and 4 parts of ethyl acrylate, and the mixture was heated up to 100° C. while stirring. Then, a transparent mixture of 32.3 parts of methyl methacrylate, 13.9 parts of ethyl acrylate, 40 parts of FM-0711 (product of Chisso Corporation), 21.7 parts of the monomer mixture M1 described in The Production Example M1, 10 parts of xylene, 1.2 parts of Nofmer MSD α-methylstyrene dimer, product of NOF Corporation), 2.5 parts of AIBN, and 0.8 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a pale yellow transparent resin composition P13 comprising metal atom-containing copolymer. The solid content was 45.1% by weight. The Gardner viscosity was +U.

The weight-average molecular weight of the copolymer in P13 was 8,800 when P13 was analyzed by Gel Permeation Chromatography (HLC-8120GPC by Tosoh Corporation, eluate: dimethylformamide).

Production Example P14

Production of a Resin Composition P14 Comprising Metal Atom-Containing Copolymer Into a four-neck flask equipped with a condenser, a thermometer, a dropping funnel and a stirrer was charged 15 parts of PGM (propylene glycol methyl ether) and 61 parts of xylene, and the mixture was heated up to 100° C. while stirring. Then, a transparent mixture of 18 parts of methyl methacrylate, 25 parts of ethyl acrylate, 40 parts of X-24-8201 (product of Shin-Etsu Chemical Co., Ltd.), 28.4 parts of the monomer mixture M2 described in The Production Example M2, 20 parts of PGM, 2.5 parts of AIBN, and 1 part of AMBN was added dropwise from the dropping funnel over 4 hours at constant speed. After completion of addition, 0.5 parts of t-butyl peroctoate and 10 parts of xylene were added dropwise over 30 minutes, the mixture was further stirred for 1 hour and 30 minutes, then, to this was added 4.6 parts of xylene to obtain a pale yellow transparent resin composition P14 comprising metal atom-containing copolymer. The solid content was 45.2% by weight. The Gardner viscosity was +U.

The weight-average molecular weight of the copolymer in P14 was 8,200 when P14 was analyzed by Gel Permeation Chromatography (HLC-8120GPC by Tosoh Corporation, eluate: dimethylformamide).

Production Example P15

Production of a Resin Composition P15 Comprising Metal Atom-Containing Copolymer Into a four-neck flask equipped with a condenser, a thermometer, a dropping funnel and a stirrer was charged 35 parts of PGM (propylene glycol methyl ether) and 41 parts of xylene, and the mixture was heated up to 100° C. while stirring. Then, a transparent mixture of 18 parts of methyl methacrylate, 15 arts of ethyl acrylate, 50 parts of X-24-8201 (product of Shin-Etsu Chemical Co., Ltd.), 42.5 parts of the monomer mixture M3 described in The Production Example M3, 5 parts of PGM, 2.5 parts of AIBN, and 1 part of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 5.5 parts of xylene to obtain a pale yellow transparent resin composition P15 comprising metal atom-containing copolymer; The solid content was 45.0% by weight. The Gardner viscosity was +R.

The weight-average molecular weight of the copolymer in P15 was 7,200 when P15 was analyzed by Gel Permeation Chromatography (HLC-8120GPC by Tosoh Corporation, eluate: dimethylformamide).

Production Example P16

Production of a Resin Composition P16 Comprising Metal Atom-Containing Copolymer Into a four-neck flask equipped with a condenser, a thermometer, a dropping funnel and a stirrer was charged 15 parts of PGM (propylene glycol methyl ether), 59 parts of xylene and 4 parts of ethyl acrylate, and the mixture was heated up to 100° C. while stirring. Then, a transparent mixture of 26.4 parts of methyl methacrylate, 25.5 parts of ethyl acrylate, 30 parts of F-254-04 (product of Nippon Unicar Co., Ltd.), 31.3 parts of the monomer mixture M1 described in The Production Example M1, 10 parts of xylene, 1.5 parts of Nofmer MSD α-methylstyrene dimer, product of NOF Corporation), 2.5 parts of AIBN, and 4 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.8 parts of xylene to obtain a pale yellow transparent resin composition P16 comprising metal atom-containing copolymer. The solid content was 45.8% by weight. The Gardner viscosity was −W.

The weight-average molecular weight of the copolymer in P16 was 6,400 when P16 was analyzed by Gel Permeation Chromatography (HLC-8120GPC by Tosoh Corporation, eluate: dimethylformamide).

Production Example P17

Production of a Resin Composition P17 Comprising Metal Atom-Containing Copolymer Into a four-neck flask equipped with a condenser, a thermometer, a dropping funnel and a stirrer was charged 15 parts of PGM (propylene glycol methyl ether), 59 parts of xylene and 4 parts of ethyl acrylate, and the mixture was heated up to 100° C. while stirring. Then, a transparent mixture of 21.4 parts of methyl methacrylate, 25.5 parts of ethyl acrylate, 30 parts of F-254-14 (product of Nippon Unicar Co., Ltd.), 31.3 parts of the monomer mixture M1 described in The Production Example M1, 10 parts of xylene, 1.5 parts of Nofmer MSD α-methylstyrene dimer, product of NOF Corporation), 2.5 parts of AIBN, and 2.5 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.8 parts of xylene to obtain a pale yellow transparent resin composition P17 comprising metal atom-containing copolymer. The solid content was 45.3% by weight. The Gardner viscosity was −T.

The weight-average molecular weight of the copolymer in P17 was 6,900 when P17 was analyzed by Gel Permeation Chromatography (HLC-8120GPC by Tosoh Corporation, eluate: dimethylformamide).

Production Example P18

Production of a Resin Composition P18 Comprising Metal Atom-Containing Copolymer Into a four-neck flask equipped with a condenser, a thermometer, a dropping funnel and a stirrer was charged 15 parts of PGM (propylene glycol methyl ether), 59 parts of xylene and 4 parts of ethyl acrylate, and the mixture was heated up to 100° C. while stirring. Then, a transparent mixture of 26.4 parts of methyl methacrylate, 10.5 parts of ethyl acrylate, 20 parts of FM-0711 (product of Chisso Corporation), 20 parts of FM-0701 (product of Chisso Corporation), 31.3 parts of the monomer mixture M1 described in The Production Example M1, 10 parts of xylene, 1.5 parts of Nofmer MSD (α-methylstyrene dimer, product of NOF Corporation), 2.5 parts of AIBN, and 2.5 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.8 parts of xylene to obtain a pale yellow transparent resin composition P18 comprising metal atom-containing copolymer. The solid content was 45.6% by weight. The Gardner viscosity was −V.

The weight-average molecular weight of the copolymer in P18 was 7,000 when P18 was analyzed by Gel Permeation Chromatography (HLC-8120GPC by Tosoh Corporation, eluate: dimethylformamide).

Production Example P19

Production of a Resin Composition P19 Comprising Metal Atom-Containing Copolymer Into a four-neck flask equipped with a condenser, a thermometer, a dropping funnel and a stirrer was charged 15 parts of PGM (propylene glycol methyl ether) and 61 parts of xylene, and the mixture was heated up to 100° C. while stirring. Then, a transparent mixture of 18 parts of methyl methacrylate, 35 parts of ethyl acrylate, 30 parts of F2-302-01 (product of Nippon Unicar Co., Ltd.), 28.4 parts of the monomer mixture M2 described in The Production Example M2, 20 parts of PGM, 2.5 parts of AIBN, and 2 parts of AMBN was added dropwise from the dropping funnel over 4 hours at constant speed. After completion of addition, 0.5 parts of t-butyl peroctoate and 10 parts of xylene were added dropwise over 30 minutes, the mixture was further stirred for 1 hour and 30 minutes, then, to this was added 4.6 parts of xylene to obtain a pale yellow transparent resin composition P19 comprising metal atom-containing copolymer.

The solid content was 45.3% by weight. The Gardner viscosity was +T.

The weight-average molecular weight of the copolymer in P19 was 7,700 when P19 was analyzed by Gel Permeation Chromatography (HLC-8120GPC by Tosoh Corporation, eluate: dimethylformamide).

Production Example P20

Production of a Resin Composition P20 Comprising Metal Atom-Containing Copolymer Into a four-neck flask equipped with a condenser, a thermometer, a dropping funnel and a stirrer was charged 15 parts of PGM (propylene glycol methyl ether), 59 parts of xylene and 4 parts of ethyl acrylate, and the mixture was heated up to 100° C. while stirring. Then, a transparent mixture of 26.4 parts of methyl methacrylate, 35.5 parts of ethyl acrylate, 20 parts of F-302-04 (product of Nippon Unicar Co., Ltd.), 31.3 parts of the monomer mixture M1 described in The Production Example M1, 10 parts of xylene, 1.5 parts of Nofmer MSD α-methylstyrene dimer, product of NOF Corporation), 2.5 parts of AIBN, and 5.5 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.8 parts of xylene to obtain a pale yellow transparent resin composition P20 comprising metal atom-containing copolymer. The solid content was 45.6% by weight. The Gardner viscosity was +W.

The weight-average molecular weight of the copolymer in P20 was 6,000 when P20 was analyzed by Gel Permeation Chromatography (HLC-8120GPC by Tosoh Corporation, eluate: dimethylformamide).

Production Example P21

Production of a Resin Composition P21

Into a four-neck flask equipped with a condenser, a thermometer, a dropping funnel and a stirrer was charged 15 parts of PGM (propylene glycol methyl ether) and 50 parts of xylene, and the mixture was heated up to 110° C. while stirring. Then, a transparent mixture of 42.1 parts of methyl methacrylate, 37.9 parts of ethyl acrylate, 20 parts of FM-7721 (product of Chisso Corporation), 30 parts of xylene, 11.9 parts of PGM, 3 parts of Nofmer MSD (α-methylstyrene dimer, product of NOF Corporation), 2.5 parts of AIBN, and 7 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 5.1 parts of xylene to obtain a milky resin composition P21. The solid content was 45.1% by weight. The Gardner viscosity was +J.

The weight-average molecular weight of the copolymer in P21 was 9,400 when P21 was analyzed by Gel Permeation Chromatography (HLC-8120GPC by Tosoh Corporation, eluate: dimethylformamide).

Production Example P22

Production of a Resin Composition P22

Into a four-neck flask equipped with a condenser, a thermometer, a dropping funnel and a stirrer was charged 15 parts of PGM (propylene glycol methyl ether) and 70 parts of xylene, and the mixture was heated up to 110° C. while stirring. Then, a transparent mixture of 42.1 parts of methyl methacrylate, 17.9 parts of ethyl acrylate, 10 parts of FM-7711 (product of Chisso Corporation), 30 parts of FM-0711 (product of Chisso Corporation), 10 parts of xylene, 11.9 parts of PGM, 3 parts of Nofmer MSD (α-methylstyrene dimer, product of NOF Corporation), 2.5 parts of AIBN, and 7 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 5.1 parts of xylene to obtain a transparent resin composition P22. The solid content was 45.5% by weight. The Gardner viscosity was +E.

The weight-average molecular weight of the copolymer in P22 was 8,600 when P22 was analyzed by Gel Permeation Chromatography (HLC-8120GPC by Tosoh Corporation, eluate: dimethylformamide).

Production Example P23

Production of a Resin Composition P23 Comprising Metal Atom-Containing Copolymer Into a four-neck flask equipped with a condenser, a thermometer, a dropping funnel and a stirrer was charged 120 parts of xylene and 30 parts of n-butanol, and the mixture was heated up to 100° C. while stirring. Then, a mixture of 20 parts of ethyl acrylate, 25 parts of 2-ethylhexyl acrylate, 15 parts of acrylic acid, 40 parts of FM-0711 (these are produced by Chisso Corporation), and 1 part of AIBN was added dropwise from the dropping funnel over 3 hours at constant speed. After completion of addition, the mixture was further stirred for 2 hours, and a varnish was obtained. The solid content was 39.4% by weight. The Gardner viscosity was +B.

And into a four-neck flask equipped with a condenser, a thermometer, a dropping funnel and a stirrer was charged 100 parts of the obtained varnish, 20 parts of naphthenic acid and 7 parts of copper hydroxide, and the mixture was heated up to 120° C. and 2.6 g of water was dehydrated while stirring for 2 hours to obtain a resin composition P23 comprising metal atom-containing copolymer. The solid content was 50.8% by weight. The Gardner viscosity was +E.

The weight-average molecular weight of the copolymer in P23 was 9,200 when P23 was analyzed by Gel Permeation Chromatography (HLC-8120GPC by Tosoh Corporation, eluate: dimethylformamide).

Production Example P24

Production of a Resin Composition P24 Comprising Metal Atom-Containing Copolymer Into a four-neck flask equipped with a condenser, a thermometer, a dropping funnel and a stirrer was charged 15 parts of PGM (propylene glycol methyl ether), 65 parts of xylene and 4 parts of ethyl acrylate, and the mixture was heated up to 100° C. while stirring. Then, a transparent mixture of 32.3 parts of methyl methacrylate, 53.9 parts of ethyl acrylate, 21.7 parts of the monomer mixture M1 described in The Production Example M1, 10 parts of xylene, 1.2 parts of Nofmer MSD (α-methylstyrene dimer, product of NOF Corporation), 2.5 parts of AIBN, and 4 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a pale yellow transparent resin composition P24 comprising metal atom-containing copolymer. The solid content was 45.6% by weight. The Gardner viscosity was −S.

The weight-average molecular weight of the copolymer in P24 was 6,600 when P24 was analyzed by Gel Permeation Chromatography (HLC-8120GPC by Tosoh Corporation, eluate: dimethylformamide).

Production Example P25

Production of a Resin Composition P25 Comprising Metal Atom-Containing Copolymer Into a four-neck flask equipped with a condenser, a thermometer, a dropping funnel and a stirrer was charged 15 parts of PGM (propylene glycol methyl ether) and 61 parts of xylene, and the mixture was heated up to 100° C. while stirring. Then, a transparent mixture of 15.6 parts of methyl methacrylate, 40 parts of X-24-8201 (product of Shin-Etsu Chemical Co., Ltd.), 32.3 parts of the monomer mixture M4 described in The Production Example M4, 20 parts of PGM, 1.5 parts of AIBN was added dropwise from the dropping funnel over 4 hours at constant speed. After completion of addition, 0.5 parts of t-butyl peroctoate and 10 parts of xylene were added dropwise over 30 minutes, the mixture was further stirred for 1 hour and 30 minutes, then, to this was added 3.1 parts of xylene to obtain a pale yellow transparent resin composition P25 comprising metal atom-containing copolymer. The solid content was 44.8% by weight. The Gardner viscosity was +K.

The weight-average molecular weight of the copolymer in P25 was 9,000 when P25 was analyzed by Gel Permeation Chromatography (HLC-8120GPC by Tosoh Corporation, eluate: dimethylformamide).

Production Example P26

Production of a Resin Composition P26

Into a four-neck flask equipped with a condenser, a thermometer, a dropping funnel and a stirrer was charged 15 parts of PGM (propylene glycol methyl ether) and 65 parts of xylene, and the mixture was heated up to 100° C. while stirring. Then, a transparent mixture of 42.1 parts of methyl methacrylate, 37.9 parts of ethyl acrylate, 20 parts of FM-0711 (product of Chisso Corporation), 10 parts of xylene, 11.9 parts of PGM, 1.2 parts of Nofmer MSD (α-methylstyrene dimer, product of NOF Corporation), 2.5 parts of AIBN, and 2 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a transparent resin composition P26. The solid content was 44.8% by weight. The Gardner viscosity was +E.

The weight-average molecular weight of the copolymer in P26 was 6,200 when P26 was analyzed by Gel Permeation Chromatography (HLC-8120GPC by Tosoh Corporation, eluate: dimethylformamide).

Production Example P27

Production of a Resin Composition P27

Into a four-neck flask equipped with a condenser, a thermometer, a dropping funnel and a stirrer was charged 15 parts of PGM (propylene glycol methyl ether) and 65 parts of xylene, and the mixture was heated up to 100° C. while stirring. Then, a transparent mixture of 42.1 parts of methyl methacrylate, 17.9 parts of ethyl acrylate, 40 parts of FM-0711 (product of Chisso Corporation), 10 parts of xylene, 11.9 parts of PGM, 1.2 parts of Nofmer MSD (α-methylstyrene dimer, product of NOF Corporation), 2.5 parts of AIBN, and 0.8 parts of AMBN was added dropwise from the dropping funnel over 6 hours at constant speed. After completion of addition, 0.5 parts of t-butyl peroctoate and 10 parts of xylene were added dropwise over 30 minutes, the mixture was further stirred for 1 hour and 30 minutes, then, to this was added 10.1 parts of xylene to obtain a transparent resin composition P27. The solid content was 44.4% by weight. The Gardner viscosity was +C.

The weight-average molecular weight of the copolymer in P27 was 6,600 when P27 was analyzed by Gel Permeation Chromatography (HLC-8120GPC by Tosoh Corporation, eluate: dimethylformamide).

The charging amount (molar ratio) of raw materials for the monomer mixtures M1-M4 in the Production Examples M1-M4, the volatile substance content (% by weight), the metal atom content (% by weight), and the solid content (% by weight) are shown in Table 1.

TABLE 1

| Monomer mixture | | M1 | M2 | M3 | M4 |
|---|---|---|---|---|---|
| Charging amount (molar ratio) | Methyl methacrylate | 0.35 | 0.35 | 0.375 | 0.25 |
| | Acrylic acid | 0.35 | 0.35 | 0.375 | 0.25 |
| | Zinc oxide | 0.5 | 0.5 | 0.5 | 0.5 |
| | Water | 0.27 | | | |
| | Versatic acid | | 0.3 | | 0.5 |
| | Oleic acid | | | 0.133 | |
| | Propionic acid | | | 0.078 | |
| | Acetic acid | | | 0.039 | |
| Content in matal-containing monomer dissolved mixture | Xylene | — | — | 17.2 | — |
| | Propylene glycol methyl ether | 49.3 | 36.1 | 39.6 | 36.6 |

TABLE 1-continued

| Monomer mixture | M1 | M2 | M3 | M4 |
|---|---|---|---|---|
| (% by weight) Metal | 13.3 | 14.2 | 9.6 | 12.5 |
| Solid content (% by weight) | 44.8 | 59.6 | 39.7 | 59.8 |

The charging amount (molar ratio) of raw materials for the resin composition comprising metal atom-containing copolymer in the Production Examples P1-P9, P11-P20, P24, and P25, the charging amount (molar ratio) of raw materials for the resin composition in the Production Examples P21, P22, P26, and P27, the Gardner viscosity, and the solid content (% by weight) are shown in Table 2.

TABLE 2

| | | P1 | P2 | P3 | P4 | P5 | P6 | P7 | P8 | P9 | P11 | P12 | P13 | P14 |
|---|---|---|---|---|---|---|---|---|---|---|---|---|---|---|
| Silicon-containing polymerizable monomers ($a_1$) (parts) | FM-7711 | 10 | | | | 5 | | 10 | | | | | | |
| | FM-7721 | | 20 | | | | 10 | 10 | | | | | | |
| | F2-354-04 | | | 15 | | | | | | | | | | |
| Silicon-containing polymerizable monomers ($a_2$) (parts) | F2-312-01 | | | | 20 | | | | | | | | | |
| | F2-312-04 | | | | | | | | 2 | 10 | | | | |
| Silicon-containing polymerizable monomers ($b_1$) (parts) | FM-0711 | | | | | 35 | | 30 | | | | 20 | 40 | |
| | X-24-8201 | | | | | | 30 | | | | | | | 40 |
| | FM-0721 | | | | | | | | | | 10 | | | |
| | F2-254-04 | | | | | | | | | | | | | |
| | F2-254-14 | | | | | | | | | | | | | |
| Silicon-containing polymerizable monomers ($b_2$) (parts) | TM-0701 | | | | | | | | | 10 | | | | |
| | F2-302-01 | | | | | | | | | | | | | |
| | F2-302-04 | | | | | | | | 38 | | | | | |
| Metal atom-containing polymerizable monomers (c) (parts) | M1 | 21.7 | 21.7 | 31.3 | 31.3 | 21.7 | | | 31.3 | | 21.7 | 21.7 | 21.7 | |
| | M2 | | | | | | 28.4 | | | | 28.4 | | | 28.4 |
| | M3 | | | | | | | 42.5 | | | | | | |
| | M4 | | | | | | | | | | | | | |
| Polymerizable monomers (d) (parts) | MMA | 32.3 | 32.3 | 26.4 | 26.4 | 32.3 | 18 | 18 | 26.4 | 18 | 32.3 | 32.3 | 32.3 | 18 |
| | EA | 47.9 | 37.9 | 44.5 | 39.5 | 17.9 | 25 | 15 | 19.5 | 45 | 47.9 | 37.9 | 17.9 | 25 |
| | 2-MTA | | | | | | | | | | | | | |
| | St | | | | | | | | | | | | | |
| Polymerization initiator (parts) | AIBN | 2.5 | 2.5 | 2.5 | 2.5 | 2.5 | 2.5 | 2.5 | 2.5 | 2.5 | 2.5 | 2.5 | 2.5 | 2.5 |
| | AMBN | 7.5 | 5 | 8 | 7.5 | 4 | 2.5 | 4.5 | 5.5 | 5 | 3 | 2 | 0.8 | 1 |
| Chain-transfer agent (parts) | Nofmer MSD | 2 | 1.5 | 2 | 1.5 | 1.2 | | | 1.2 | | 1.2 | 1.2 | 1.2 | |
| Property value | Gardner Viscosity (25° C.) | +W | +U | +R | −W | +V | −V | −T | −T | +W | −U | +V | +U | +U |
| | Solid Content (wt %) | 46.2 | 46.1 | 46.4 | 45.8 | 45.6 | 45.4 | 45.6 | 45.6 | 45.6 | 45.7 | 45.4 | 45.1 | 45.2 |

| | | P15 | P16 | P17 | P18 | P19 | P20 | P21 | P22 | P24 | P25 | P26 | P27 |
|---|---|---|---|---|---|---|---|---|---|---|---|---|---|
| Silicon-containing polymerizable monomers ($a_1$) (parts) | FM-7711 | | | | | | | | 10 | | | | |
| | FM-7721 | | | | | | | 20 | | | | | |
| | F2-354-04 | | | | | | | | | | | | |
| Silicon-containing polymerizable monomers ($a_2$) (parts) | F2-312-01 | | | | | | | | | | | | |
| | F2-312-04 | | | | | | | | | | | | |
| Silicon-containing polymerizable monomers ($b_1$) (parts) | FM-0711 | | | | | 20 | | | | 30 | | 20 | 40 |
| | X-24-8201 | 50 | | | | | | | | | 40 | | |
| | FM-0721 | | | | | | | | | | | | |
| | F2-254-04 | | 30 | | | | | | | | | | |
| | F2-254-14 | | | 30 | | | | | | | | | |
| Silicon-containing polymerizable monomers ($b_2$) (parts) | TM-0701 | | | | | | 20 | | | | | | |
| | F2-302-01 | | | | | | 30 | | | | | | |
| | F2-302-04 | | | | | | 20 | | | | | | |
| Metal atom-containing polymerizable monomers (c) (parts) | M1 | | | 31.3 | 31.3 | 31.3 | | 31.3 | | 21.7 | | | |
| | M2 | | | | | | 28.4 | | | | | | |
| | M3 | 42.5 | | | | | | | | | | | |
| | M4 | | | | | | | | | | 32.3 | | |
| Polymerizable monomers (d) (parts) | MMA | 18 | 26.4 | 21.4 | 26.4 | 18 | 26.4 | 42.1 | 42.1 | 32.3 | 15.6 | 42.1 | 42.1 |
| | EA | 15 | 29.5 | 29.5 | 14.5 | 35 | 39.5 | 37.9 | 17.9 | 57.9 | 25 | 37.9 | 17.9 |
| | 2-MTA | | | | 5 | | | | | | | | |
| | St | | | | 5 | | | | | | | | |
| Polymerization initiator (parts) | AIBN | 2.5 | 2.5 | 2.5 | 2.5 | 2.5 | 2.5 | 2.5 | 2.5 | 2.5 | 1.5 | 2.5 | 2.5 |
| | AMBN | 1 | 4 | 2.5 | 2.5 | 2 | 5.5 | 7 | 7 | 4 | | 2 | 0.8 |
| Chain-transfer agent (parts) | Nofmer MSD | | 1.5 | 1.5 | 1.5 | | 1.5 | 3 | 3 | 1.2 | | 1.2 | 1.2 |
| Property value | Gardner Viscosity (25° C.) | +R | −W | −T | −V | +T | +W | +J | +E | −S | +K | +E | +C |
| | Solid Content (wt %) | 45 | 45.8 | 45.3 | 45.6 | 45.3 | 45.6 | 45.1 | 45.5 | 45.6 | 44.8 | 44.8 | 44.4 |

(Notes)

FM-7711 (produced by Chisso Corporation): In the formula (I), l=0, q=0, m=3, o=3, $R^1$—$R^6$=$CH_3$, n=10.

FM-7721 (produced by Chisso Corporation): In the formula (I), l=0, q=0, m=3, o=3, $R^1$—$R^6$=$CH_3$, n=65.

F2-354-04 (produced by Nippon Unicar Co., Ltd.): In the formula (I), l=10, q=10, each of k and p represents 2 or 3 (molar ratio is 5:5), m=3, o=3, $R^1$-$R^6$=$CH_3$, n=10.

F2-312-01 (produced by Nippon Unicar Co., Ltd.): In the formula (II), l'=0, q'=0, m'=3, o'=3, $R^1$—$R^{22}$=$CH_3$, r=3, s=3.

F2-312-04 (produced by Nippon Unicar Co., Ltd.): In the formula (II), l'=10, q'=10, each of k' and p' represents 2 or 3 (molar ratio is 5:5), m'=3, o'=3, $R^{11}$—$R^{22}$=$CH_3$, r=3, s=3.

FM-0711 (produced by Chisso Corporation): In the formula (III), v=0, $R^{41}$—$R^{46}$=$CH_3$, w=3, x=10.

X-24-8201 (produced by Shin-Etsu Chemical Co., Ltd.): In the formula (III), v=0, $R^{41}$-$R^{46}$=$CH_3$, w=3, x=25.

FM-0721 (produced by Chisso Corporation): In the formula (III), v=0, $R^{41}$—$R^{46}$=$CH_3$, w=3, x=65.

F2-254-04 (produced by Nippon Unicar Co., Ltd.): In the formula (III), v=10, u represents 2 or 3 (molar ratio is 5:5) $R^{41}$—$R^{46}$=$CH_3$, w=3, x=10.

F2-254-14 (produced by Nippon Unicar Co., Ltd.): In the formula (III), v=4, u represents 2 or 3 (molar ratio is 5:5) $R^{41}$—$R^{46}$=$CH_3$, w=3, x=10.

TM-0701 (produced by Chisso Corporation): In the formula (IV), v'=0, w'=3, $R^{51}$—$R^{54}$=$CH_3$.

F2-302-01 (produced by Nippon Unicar Co., Ltd.): In the formula (IV), v'=0, w'=3, $R^{51}$=$CH_3$, each of $R^{52}$—$R^{54}$ represents $R_{55}$ (y=3, $R^{56}$—$R^{60}$=$CH_3$).

F2-302-04 (produced by Nippon Unicar Co., Ltd.): In the formula (IV), v'=0, u' represents 2 or 3 (molar ratio is 5:5), w'=3, $R^{52}$—$R^{54}$=$CH_3$.

MMA: Methyl methacrylate.

EA: Ethyl acrylate.

2-MTA: 2-methoxyethyl acrylate.

St: Styrene.

AIBN: Azobis isobutyronitrile.

AMBN: Azobis methylbutyronitrile.

Nofmer MSD (produced by NOF Corporation): α-methylstyrene dimer.

Using the above-mentioned resin compositions P1-P20, the antifouling paint compositions of the present invention (Examples 1-24) were formulated. The components of the Examples were shown in Table 3. Also, using the above-mentioned resin compositions P21-P27, the antifouling paint compositions of Comparative Examples 1-9 were formulated. The components of the Comparative Examples were shown in Table 3.

TABLE 3

| | | Examples | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| Resin compositions (parts) | P1 | 40 | | | | | | | | | | | | | | | | | |
| | P2 | | 40 | | | | | | | | | | | | | | | | |
| | P3 | | | 40 | | | | | | | | 40 | 40 | | | | | | |
| | P4 | | | | 40 | | | | | | | | | | | | | | |
| | P5 | | | | | 40 | | | | | | | | | | | | | |
| | P6 | | | | | | 40 | | | | | | | | | | | | |
| | P7 | | | | | | | 40 | | | | | | | | | | | |
| | P8 | | | | | | | | 40 | | | | | | | | | | |
| | P9 | | | | | | | | | 40 | | | | | | | | | |
| | P10 | | | | | | | | | | 40 | | | | | | | | |
| | P11 | | | | | | | | | | | | | 40 | | | | | |
| | P12 | | | | | | | | | | | | | | 40 | | | | |
| | P13 | | | | | | | | | | | | | | | 40 | | | |
| | P14 | | | | | | | | | | | | | | | | 40 | | |
| | P15 | | | | | | | | | | | | | | | | | 40 | |
| | P16 | | | | | | | | | | | | | | | | | | 40 |
| | P17 | | | | | | | | | | | | | | | | | | |
| | P18 | | | | | | | | | | | | | | | | | | |
| | P19 | | | | | | | | | | | | | | | | | | |
| | P20 | | | | | | | | | | | | | | | | | | |
| | P21 | | | | | | | | | | | | | | | | | | |
| | P22 | | | | | | | | | | | | | | | | | | |
| | P23 | | | | | | | | | | | | | | | | | | |
| | P24 | | | | | | | | | | | | | | | | | | |
| | P25 | | | | | | | | | | | | | | | | | | |
| | P26 | | | | | | | | | | | | | | | | | | |
| | P27 | | | | | | | | | | | | | | | | | | |
| CR-90 (parts) | | | | | | | | | | | | | 15 | 25 | | | | | |
| OK-412 (parts) | | | | | | | | | | | | | 3 | 3 | | | | | |
| Disparlon 4200 (parts) | | | | | | | | | | | | | 1 | 1 | | | | | |
| Xylene (parts) | | | | | | | | | | | | | 5 | 8 | | | | | |

| | | Examples | | | | | | Comparative Examples | | | | | | | | |
|---|---|---|---|---|---|---|---|---|---|---|---|---|---|---|---|---|
| | | 19 | 20 | 21 | 22 | 23 | 24 | 1 | 2 | 3 | 4 | 5 | 6 | 7 | 8 | 9 |
| Resin compositions (parts) | P1 | | | | | | | | | | | | | | | |
| | P2 | | | | | | | | | | | | | | | |
| | P3 | | | | | | | | | | | | | | | |
| | P4 | | | | | | | | | | | | | | | |
| | P5 | | | | | | | | | | | | | | | |
| | P6 | | | | | | | | | | | | | | | |
| | P7 | | | | | | | | | | | | | | | |

TABLE 3-continued

| | 1 | 2 | 3 | 4 | 5 | 6 | 7 | 8 | 9 |
|---|---|---|---|---|---|---|---|---|---|
| P8 | | | | | | | | | |
| P9 | | | | | | | | | |
| P10 | | | | | | | | | |
| P11 | | | | | | | | | |
| P12 | | | | | | | | | |
| P13 | | | | | | | | | |
| P14 | | | | | | | | | |
| P15 | | | | | | | | | |
| P16 | | | 40 | 40 | | | | | |
| P17 | 40 | | | | | | | | |
| P18 | | 40 | | | | | | | |
| P19 | | | 40 | | | | | | |
| P20 | | | | 40 | | | | | |
| P21 | | | | | 40 | | | | |
| P22 | | | | | | 40 | 40 | | |
| P23 | | | | | | | 40 | | |
| P24 | | | | | | | | 40 | |
| P25 | | | | | | | | 40 | |
| P26 | | | | | | | | | 40 |
| P27 | | | | | | | | 40 | 40 |
| CR-90 (parts) | | | 15 | 25 | | 15 | | | 15 |
| OK-412 (parts) | | | 3 | 3 | | 3 | | | 3 |
| Disparlon 4200 (parts) | | | 1 | 1 | | 1 | | | 1 |
| Xylene (parts) | | | 5 | 8 | | 5 | | | 5 |

(Notes)
CR-90: Produced by Ishihara Sangyo Kaisha Ltd., Titanium dioxide.
OK-412: Produced by Degussa AG, Silica powder.
Disparlon 4200: Produced by Kusumoto Chemicals Ltd., Anti-sagging agent.

The above-mentioned antifouling paint compositions were then subjected to a coating consumption test, an antifouling test, and a peeling test in the following ways.

(1) Coating Consumption Test

Each of the antifouling paint compositions was applied on a hard vinyl chloride plate of 50×50×2(thickness) mm to obtain a dry coating whose thickness is 240 μm. The coated plate was set to a rotary drum placed in seawater. The drum was continued rotating at a peripheral speed of 15 knots, and the thickness of the consumed coating on the plate was measured every six months for 24 months. The results are shown in Table 4.

(2) Antifouling Test

Each of the antifouling paint compositions was applied on a sandblasted and antirust-coated steel plate to obtain a test plate having a dry coating whose thickness is 240 μm. The test plate was kept stationarily immersed in seawater in Hiroshima Bay, Hiroshima Prefecture, for 24 months, and the area (%) of the plate encrusted with extraneous matter was examined every six months. The result is shown in Table 4.

(3) Peeling Test

Each of the antifouling paint compositions of Examples 1-24 and Comparative Examples 1-9 was applied on the following bases (1) and (2) to obtain test plates 1 and 2 having the dry coating whose thickness is 120 μm. The each of the test plate 2 was coated with the same composition used for preparing the base (2).

Base (1): A sandblasted steel plate with antitrust coating.
Base (2): The each of the antifouling paint compositions of the Examples 1-24 and the Comparative Examples 1-9 was applied on the Base (1), and a plate having a coating whose thickness was 120 μm was prepared. The plate was immersed in sterilized and filtered seawater for three months and then dried at room temperature for one week to obtain a Base (2).

The test plates 1 and 2 were immersed in sterilized and filtered seawater for six months and then dried at room temperature for one week, and peeling conditions of them were examined. The results were shown in Table 4.

Scratches in 1 cm square which reached to the base were made in the coating at 2 mm spacings to make 25 square boxes, and after sticking cellophane tape thereover and peeling it off at one stroke, the peeling condition of each of the test plates was evaluated based on the number of squares which remained without peeling.

The condition was represented by ⊚ when there was no peeling of the square box and no partial peeling at the edge of the square box, the condition was represented by ○ when there was no peeling of the square box and there were some partial peelings at the edges of some square boxes, the condition was represented by Δ when there were from 1 to 12 peelings of the square boxes, and the condition was represented by x when there were from 13 to 25 peelings of the square boxes.

TABLE 4

| | | | Examples | | | | | | | | |
|---|---|---|---|---|---|---|---|---|---|---|---|
| | | | 1 | 2 | 3 | 4 | 5 | 6 | 7 | 8 | 9 |
| Coating Consumprion Test | Consumed coating thickness (μm) | 6 months | 19 | 15 | 69 | 26 | 13 | 25 | 40 | 44 | 32 |
| | | 12 months | 35 | 27 | 136 | 48 | 25 | 48 | 79 | 82 | 62 |
| | | 18 months | 53 | 40 | 202 | 72 | 36 | 70 | 116 | 116 | 91 |
| | | 24 months | 70 | 54 | — | 96 | 45 | 91 | 151 | 148 | 119 |
| | Monthly average of consumed coating thickness (μm) | | 2.9 | 2.3 | 11.2 | 4.0 | 1.9 | 3.8 | 6.3 | 6.2 | 5.0 |
| Antifouling Test | Encrusted area (%) | 6 months | 0 | 0 | 0 | 0 | 0 | 0 | 0 | 0 | 0 |
| | | 12 months | 0 | 0 | 0 | 0 | 0 | 0 | 0 | 0 | 0 |

TABLE 4-continued

| | | | | | | | | | | | |
|---|---|---|---|---|---|---|---|---|---|---|---|
| | | 18 months | 50 | 10 | 0 | 0 | 0 | 0 | 0 | 0 | 0 |
| | | 24 months | 70 | 30 | 0 | 0 | 0 | 0 | 0 | 0 | 0 |
| Peeling Test | Base (1) | | ◎ | ◎ | ◎ | ◎ | ◎ | ◎ | ◎ | ◎ | ◎ |
| | Base (2) | | ◎ | ◎ | ◎ | ◎ | ◎ | ◎ | ◎ | ◎ | ◎ |

| | | | Examples | | | | | | | |
|---|---|---|---|---|---|---|---|---|---|---|
| | | | 10 | 11 | 12 | 13 | 14 | 15 | 16 | 17 |
| Coating Consumprion Test | Consumed coating thickness (μm) | 6 months | 30 | 51 | 46 | 18 | 13 | 12 | 23 | 44 |
| | | 12 months | 43 | 100 | 90 | 33 | 25 | 23 | 42 | 83 |
| | | 18 months | 53 | 151 | 134 | 51 | 36 | 32 | 59 | 112 |
| | | 24 months | 61 | 199 | 179 | 67 | 46 | 41 | 72 | 134 |
| | Monthly average of consumed coating thickness (μm) | | 2.5 | 8.3 | 7.5 | 2.8 | 1.9 | 1.7 | 3.0 | 5.6 |
| Antifouling Test | Encrusted area (%) | 6 months | 0 | 0 | 0 | 0 | 0 | 0 | 0 | 0 |
| | | 12 months | 0 | 0 | 0 | 50 | 0 | 0 | 0 | 0 |
| | | 18 months | 10 | 0 | 0 | 70 | 30 | 0 | 30 | 30 |
| | | 24 months | 30 | 0 | 0 | 100 | 70 | 50 | 70 | 70 |
| Peeling Test | Base (1) | | ◎ | ◎ | ◎ | ◎ | ◎ | ◎ | ◎ | ◎ |
| | Base (2) | | Δ | ◎ | ◎ | ○ | Δ | Δ | Δ | Δ |

| | | | Examples | | | | | | |
|---|---|---|---|---|---|---|---|---|---|
| | | | 18 | 19 | 20 | 21 | 22 | 23 | 24 |
| Coating Consumprion Test | Consumed coating thickness (μm) | 6 months | 58 | 27 | 22 | 49 | 62 | 43 | 40 |
| | | 12 months | 113 | 50 | 40 | 94 | 119 | 84 | 78 |
| | | 18 months | 165 | 72 | 57 | 128 | 165 | 123 | 114 |
| | | 24 months | 214 | 93 | 73 | 154 | 212 | 159 | 146 |
| | Monthly average of consumed coating thickness (μm) | | 8.9 | 3.9 | 3.0 | 6.4 | 8.8 | 6.6 | 6.1 |
| Antifouling Test | Encrusted area (%) | 6 months | 0 | 0 | 0 | 0 | 0 | 0 | 0 |
| | | 12 months | 0 | 0 | 0 | 0 | 0 | 0 | 30 |
| | | 18 months | 0 | 10 | 0 | 30 | 0 | 0 | 70 |
| | | 24 months | 30 | 50 | 50 | 70 | 50 | 50 | 100 |
| Peeling Test | Base (1) | | ◎ | ◎ | ◎ | ◎ | ◎ | ◎ | ◎ |
| | Base (2) | | ◎ | ◎ | ○ | ○ | ◎ | ◎ | ◎ |

| | | | Comparative Examples | | | | | | | | |
|---|---|---|---|---|---|---|---|---|---|---|---|
| | | | 1 | 2 | 3 | 4 | 5 | 6 | 7 | 8 | 9 |
| Coating Consumprion Test | Consumed coating thickness (μm) | 6 months | 0 | 0 | 0 | 37 | 51 | 36 | 0 | 0 | 0 |
| | | 12 months | 0 | 0 | 0 | 49 | 101 | 47 | 0 | 0 | 0 |
| | | 18 months | 0 | 0 | 0 | 56 | 149 | 52 | 0 | 0 | 0 |
| | | 24 months | 0 | 0 | 0 | 61 | 198 | 56 | 0 | 0 | 0 |
| | Monthly average of consumed coating thickness (μm) | | 0 | 0 | 0 | 2.5 | 8.3 | 2.3 | 0 | 0 | 0 |
| Antifouling Test | Encrusted area (%) | 6 months | 100 | 70 | 100 | 0 | 50 | 0 | 100 | 30 | 100 |
| | | 12 months | 100 | 100 | 100 | 30 | 100 | 70 | 100 | 100 | 100 |
| | | 18 months | 100 | 100 | 100 | 100 | 100 | 100 | 100 | 100 | 100 |
| | | 24 months | 100 | 100 | 100 | 100 | 100 | 100 | 100 | 100 | 100 |
| Peeling Test | Base (1) | | X | X | X | ○ | ◎ | ◎ | X | X | X |
| | Base (2) | | X | X | X | X | ◎ | Δ | X | X | X |

In the case of the antifouling paint compositions of Comparative Examples 1-3 and 7-9 using non-metal atom-containing copolymer obtained by polymerizing silicon-containing polymerizable monomer such as P21, P22, P26 and P27, self polishing effect were not shown in the coating consumption test, and both of the antifouling and the adhesion properties were poor.

In the case of the Comparative Examples 5 using resin composition P24 comprising metal atom-containing copolymer not obtained by polymerizing silicon-containing polymerizable monomer, the antifouling property was poor though some self polishing effect was shown.

In the case of the Comparative Examples 4 using resin composition P23 obtained by addition of metallic salt of organic acid to a silicon-containing resin having high acid value and the Comparative Examples 6 using resin composition P25 obtained by polymerizing the monomer mixture containing M4 which was the only component for the metal-containing polymerizable monomer, both of the long-term self polishing stability and the antifouling property were poor.

In contrast, the each of the antifouling paint compositions of Examples 1-9 and 11-12 using the resin compositions P1-P9 comprising copolymer prepared by polymerizing monomer mixtures comprising metal atom-containing polymerizable monomer and silicon-containing polymerizable monomer showed an excellent long-term self polishing effect, and excellent adhesion and recoating properties to a substrate. The each of them also showed an excellent antifouling effect for a long period of time even if a pigment is added to the composition. And the antifouling paint composition of Example 10 using the resin composition P10 comprising copolymer obtained by addition of metal atoms to a copolymer prepared by polymerizing a monomer mixture comprising silicon-containing polymerizable monomer having two (meth)acryl end groups showed an excellent antifouling effect for a long period of time even if a pigment is added to the composition, an excellent long-term self polishing effect, and an excellent adhesion property to a substrate.

And the each of the antifouling paint compositions of Examples 13-24 using the resin compositions P11-P20 comprising copolymer prepared by polymerizing monomer mixtures comprising metal atom-containing polymerizable monomer having two unsaturated groups and metal atoms selected from Mg, Zn, and Cu and silicon-containing polymerizable monomer showed an excellent antifouling effect for a long period of time even if a pigment is added to the composition, an excellent long-term self polishing effect, and an excellent adhesion property to a substrate. Especially, the each of the antifouling paint compositions of Examples 18, 19, and 22-24 using the resin compositions P16, P17, and P20 comprising copolymer prepared by polymerizing monomer mixtures comprising silicon-containing polymerizable monomer having polyether structure showed an excellent recoating property to a substrate.

INDUSTRIAL APPLICABILITY

The present invention relates to an antifouling paint composition having an excellent antifouling effect for a long period of time even if an antifouling substance is not contained in it, and having an excellent adhesion property to a substrate.

Obviously, numerous modifications and variations of the present invention are possible in light of the above teachings. It is therefore to be understood that within the scope of the appended claims, the invention may be practiced otherwise than as specifically described herein.

This application is based on Japanese patent applications JP 2003-069916, JP 2003-087957, JP 2004002078 and JP 2004-002079 filed in the Japanese Patent Office on Mar. 14, 2003, Mar. 27, 2003, Jan. 7, 2004 and Jan. 7, 2004, the entire contents of which of each are hereby incorporated by reference.

The invention claimed is:

1. An antifouling paint composition comprising a copolymer obtained by polymerizing a monomer mixture comprising silicon-containing polymerizable monomer (a) having two (meth)acryl end groups wherein the monomer (a) comprises monomer ($a_2$) represented by the following formula (II):

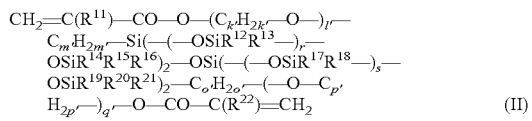
(II)

wherein each of $R^{11}$ and $R^{22}$ independently represent a hydrogen atom or a methyl group; each of k' and p' represents an integer of 2 to 5; each of l' and q' represents 0 to 50; each of m' and o' represents an integer of 2 to 5; each of r and s represents 0 to 20; each of $R^{12}$, $R^{13}$, $R^{14}$, $R^{15}$, $R^{16}$, $R^{17}$, $R^{18}$, $R^{19}$, $R^{20}$, and $R^{21}$ independently represent an alkyl group, and wherein said copolymer contains a bivalent metal atom.

2. The antifouling paint composition according to claim 1, wherein monomer (a) further comprises monomer ($a_1$) represented by the following formula (I):

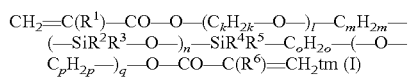
(I)

wherein each of $R^1$ and $R^6$ independently represent a hydrogen atom or a methyl group; each of k and p represents an integer of 2 to 5; each of l and q represents 0 to 50; each of m and o represents an integer of 2 to 5; n represents 3 to 80; each of $R^2$, $R^3$, $R^4$, and $R^5$ independently represent an alkyl group, an alkoxy group, a phenyl group, a substituted phenyl group, a phenoxy group, or a substituted phenoxy group.

3. The antifouling paint composition according to claim 1, wherein an amount of monomer (a) in the monomer mixture is within the range of 0.1 to 30% by weight, and an amount of the bivalent metal atom in the copolymer is within the range of 1 to 25% by weight.

4. The antifouling paint composition according to claim 1, wherein the copolymer is obtained by polymerizing the monomer mixture further comprising silicon-containing polymerizable monomer (b) having one (meth)acryl end group.

5. The antifouling paint composition according to claim 4, wherein monomer (b) comprises monomer ($b_1$) represented by the following formula (III):

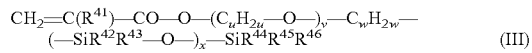
(III)

wherein $R^{41}$ represents a hydrogen atom or a methyl group; u represents an integer of 2 to 5; v represents 0 to 50; w represents an integer of 2 to 5; x represents 3 to 80; each of $R^{42}$, $R^{43}$, $R^{44}$, $R^{45}$, and $R^{46}$ independently represent an alkyl group, an alkoxy group, a phenyl group, a substituted phenyl group, a phenoxy group, or a substituted phenoxy group.

6. The antifouling paint composition according to claim 4, wherein monomer (b) comprises monomer ($b_2$) represented by the following formula (IV):

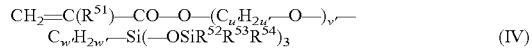
(IV)

wherein $R^{51}$ represents a hydrogen atom or a methyl group; u' represents an integer of 2 to 5; v' represents 0 to 50; w' represents an integer of 2 to 5; each of $R^{52}$, $R^{53}$, and $R^{54}$ represents an alkyl group, $R^{55}$ (which represents —(—O—SiR$^{56}$R$^{57}$—)$_y$—OSiR$^{58}$R$^{59}$R$^{60}$ wherein y represents an integer of 0 to 20; each of $R^{56}$, $R^{57}$, $R^{58}$, $R^{59}$, and $R^{60}$ independently represent an alkyl group), or $R^{61}$ (which represents —R$^{62}$—(—OC$_2$H$_4$)$_{y'}$—OR$^{63}$ wherein y' represents an integer of 1 to 20; each of $R^{62}$ and $R^{63}$ independently represent an alkyl group).

7. The antifouling paint composition according to claim 4, wherein the amount of the silicon-containing polymerizable monomer (a) and the silicon-containing polymerizable monomer (b) in the monomer mixture is within the range of 1 to 60% by weight.

8. The antifouling paint composition according to claim 1, wherein said copolymer is obtained by polymerizing the monomer mixture further comprising metal atom-containing polymerizable monomer (c) having bivalent metal atom.

9. The antifouling paint composition according to claim 8, wherein monomer (c) comprises one or more kinds of monomers selected from metal atom-containing polymerizable monomer ($c_1$) having two unsaturated groups and metal atom-containing polymerizable monomer ($c_2$) represented by the following formula (V):

(V)

wherein $R^{71}$ represents a hydrogen atom or a methyl group; M represents Mg, Zn, or Cu; and $R^{72}$ represents an organic acid residue or an alcohol residue.

10. A method of preventing attachment of a marine organism and/or seaweed onto a surface comprising applying the antifouling paint composition of claim 1 to a surface in need thereof.

11. An antifouling paint composition comprising a copolymer obtained by polymerizing a monomer mixture comprising:
   (1) a silicon-containing polymerizable monomer (a) having two (meth)acryl end groups, and
   (2) a silicon-containing polymerizable monomer (b) having (mth)acryl end group wherein monomer (b) comprises monomer ($b_2$) represented by the following formula (IV):

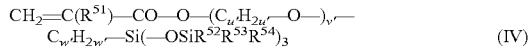
$$CH_2=C(R^{51})-CO-O-(C_uH_{2u'}-O-)_{v'}-C_{w'}H_{2w'}-Si(-OSiR^{52}R^{53}R^{54})_3 \quad (IV)$$

wherein $R^{51}$ represents a hydrogen atom or a methyl group; u' represents an integer of 2 to 5; v' represents 0 to 50; w' represents an integer of 2 to 5; each of $R^{52}$, $R^{53}$, and $R^{54}$ represents an alkyl group, $R^{55}$ (which represents $-(-O-SiR^{56}R^{57}-)_y-OSiR^{58}R^{59}R^{60}$ wherein y represents an integer of 0 to 20; each of $R^{56}$, $R^{57}$, $R^{58}$, $R^{59}$, and $R^{60}$ independently represent an alkyl group), or $R^{61}$ (which represents $-R^{62}-(-OC_2H_4)_{y'}-OR^{63}$ wherein y' represents an integer of 1 to 20; each of $R^{62}$ and $R^{63}$ independently represent an alkyl group),
wherein said copolymer contains a bivalent metal atom.

12. The antifouling paint composition according to claim 11, wherein monomer (a) comprises monomer ($a_l$) represented by the following formula (I):

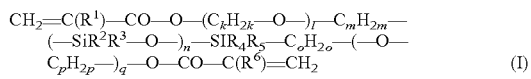
$$CH_2=C(R^1)-CO-O-(C_kH_{2k}-O-)_l-C_mH_{2m}-(-SiR^2R^3-O-)_n-SiR_4R_5-C_oH_{2o}-(-O-C_pH_{2p}-)_q-O-CO-C(R^6)=CH_2 \quad (I)$$

wherein each of $R^1$ and $R^6$ independently represent a hydrogen atom or a methyl group; each of k and p represents an integer of 2 to 5; each of l and q represents 0 to 50; each of m and o represents an integer of 2 to 5; n represents 3 to 80; each of $R^2$, $R^3$, $R^4$, and $R^5$ independently represent an alkyl group, an alkoxy group, a phenyl group, a substituted phenyl group, a phenoxy group, or a substituted phenoxy group.

13. The antifouling paint composition according to claim 11, wherein an amount of monomer (a) in the monomer mixture is within the range of 0.1 to 30% by weight, and an amount of the bivalent metal atom in the copolymer is within the range of 1 to 25% by weight.

14. The antifouling paint composition according to claim 11, wherein the monomer (b) further comprises monomer ($b_1$) represented by the following formula (III):

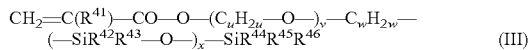
$$CH_2=C(R^{41})-CO-O-(C_uH_{2u}-O-)_v-C_wH_{2w}-(-SiR^{42}R^{43}-O-)_x-SiR^{44}R^{45}R^{46} \quad (III)$$

wherein $R^{41}$ represents a hydrogen atom or a methyl group; u represents an integer of 2 to 5; v represents 0 to 50; w represents an integer of 2 to 5; x represents 3 to 80; each of $R^{42}$, $R^{43}$, $R^{44}$, $R^{45}$, and $R^{46}$ independently represent an alkyl group, an alkoxy group, a phenyl group, a substituted phenyl group, a phenoxy group, or a substituted phenoxy group.

15. The antifouling paint composition according to claim 11, wherein the amount of the silicon-containing polymerizable monomer (a) and the silicon-containing polymerizable monomer (b) in the monomer mixture is within the range of 1 to 60% by weight.

16. The antifouling paint composition according to claim 11, wherein said copolymer is obtained by polymerizing the monomer mixture further comprising metal atom-containing polymerizable monomer (c) having bivalent metal atom.

17. The antifouling paint composition according to claim 16, wherein monomer (c) comprises one or more kinds of monomers selected from metal atom-containing polymerizable monomer ($c_1$) having two unsaturated groups and metal atom-containing polymerizable monomer ($c_2$) represented by the following formula (V):

$$CH_2=C(R^{71})-CO-O-M-R^{72} \quad (V)$$

wherein $R^{71}$ represents a hydrogen atom or a methyl group; M represents Mg, Zn, or Cu; and $R^{72}$ represents an organic acid residue or an alcohol residue.

18. A method of preventing attachment of a marine organism and/or seaweed onto a surface comprising applying the antifouling paint composition of claim 11 to a surface in need thereof.

19. An antifouling paint composition comprising a copolymer obtained by polymerizing a monomer mixture comprising silicon-containing polymerizable monomer (b) having one (meth)acryl end group, and metal atom-containing polymerizable monomer ($c_1$) having two unsaturated groups and having metal atom selected from Mg, Zn, and Cu, wherein monomer (b) comprises monomer ($b_2$) represented by the following formula (IV):

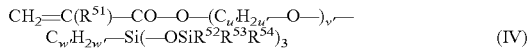
$$CH_2=C(R^{51})-CO-O-(C_uH_{2u'}-O-)_{v'}-C_{w'}H_{2w'}-Si(-OSiR^{52}R^{53}R^{54})_3 \quad (IV)$$

wherein $R^{51}$ represents a hydrogen atom or a methyl group; u' represents an integer of 2 to 5; v' represents 0 to 50; w' represents an integer of 2 to 5; each of $R^{52}$, $R^{53}$, and $R^{54}$ independently represent an alkyl group, $R^{55}$ (which represents $-(-O-SiR^{56}R^{57}-)_y-OSiR^{58}R^{59}R^{60}$ wherein y represents an integer of 0 to 20; each of $R^{56}$, $R^{57}$, $R^{58}$, $R^{59}$, and $R^{60}$ independently represent an alkyl group), or $R^{61}$ (which represents $-R^{62}-(-OC_2H_4)_{y'}-OR^{63}$ wherein y' represents an integer of 1 to 20; each of $R^{62}$ and $R^{63}$ independently represent an alkyl group).

20. The antifouling paint composition according to claim 19, wherein the monomer mixture further comprises a monomer ($b_1$) represented by the following formula (III):

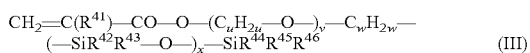
$$CH_2=C(R^{41})-CO-O-(C_uH_{2u}-O-)_v-C_wH_{2w}-(-SiR^{42}R^{43}-O-)_x-SiR^{44}R^{45}R^{46} \quad (III)$$

wherein $R^{41}$ represents a hydrogen atom or a methyl group; u represents an integer of 2 to 5;

v represents 0 to 50; w represents an integer of 2 to 5; x represents 3 to 80; each of $R^{42}$, $R^{43}$, $R^{44}$, $R^{45}$, and $R^{46}$ independently represent an alkyl group, an alkoxy group, a phenyl group, a substituted phenyl group, a phenoxy group, or a substituted phenoxy group.

21. The antifouling paint composition according to claim 19, wherein an amount of the silicon-containing polymerizable monomer (b) in the monomer mixture is within the range of 1 to 60% by weight, and an amount of the metal atom-containing polymerizable monomer ($c_1$) is within the range of 1 to 50% by weight.

22. The antifouling paint composition according to claim 19, wherein said copolymer is obtained by polymerizing the monomer mixture further comprising metal atom-containing polymerizable monomer ($c_2$) represented by the following formula (V):

$$CH_2=C(R^{71})-CO-O-M-R^{72} \quad (V)$$

wherein $R^{71}$ represents a hydrogen atom or a methyl group; M represents Mg, Zn, or Cu; and $R^{72}$ represents an organic acid residue or an alcohol residue.

23. The antifouling paint composition according to claim 22, in which the ratio (mol) of the metal atom-containing polymerizable monomer ($c_1$) and the metal atom-containing polymerizable monomer ($c_2$) in the monomer mixture (($c_2$)/($c_1$)) is within the range of 20/80 to 80/20.

24. The antifouling paint composition according to claim 22, wherein the amount of the metal atom-containing polymerizable monomer ($c_1$) and the metal atom-containing polymerizable monomer ($c_2$) in the monomer mixture is within the range of 1 to 50% by weight.

25. A method of preventing attachment of a marine organism and/or seaweed onto a surface comprising: applying the antifouling paint composition of claim 19 to a surface in need thereof.

\* \* \* \* \*